(12) United States Patent
Krishnaswamy et al.

(10) Patent No.: US 11,483,848 B2
(45) Date of Patent: Oct. 25, 2022

(54) DISTRIBUTED PHYSICAL-LAYER PROCESSING BY REMOTE UNITS OF CLOUD/CENTRALIZED RADIO ACCESS NETWORK (C-RAN)

(71) Applicant: CommScope Technologies LLC, Hickory, NC (US)

(72) Inventors: Vijayaraghavan Krishnaswamy, Bengaluru (IN); Kesava Rao Vetapalem, Bengaluru (IN); Gopikrishna Charipadi, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 142 days.

(21) Appl. No.: 16/736,659

(22) Filed: Jan. 7, 2020

(65) Prior Publication Data
US 2020/0221473 A1    Jul. 9, 2020

Related U.S. Application Data

(60) Provisional application No. 62/789,903, filed on Jan. 8, 2019.

(51) Int. Cl.
*H04W 72/12* (2009.01)
*H04W 72/04* (2009.01)

(52) U.S. Cl.
CPC ... *H04W 72/1252* (2013.01); *H04W 72/0486* (2013.01); *H04W 72/1284* (2013.01)

(58) Field of Classification Search
CPC ......... H04W 72/1252; H04W 72/1284; H04W 72/0486; H04W 88/08
See application file for complete search history.

(56) References Cited

U.S. PATENT DOCUMENTS

| | | | |
|---|---|---|---|
| 9,380,466 B2 | 6/2016 | Eyuboglu et al. |
| 9,414,399 B2 | 8/2016 | Eyuboglu et al. |
| 9,794,791 B2 | 10/2017 | Hasarchi et al. |
| 9,867,052 B2 | 1/2018 | Sabat, Jr. et al. |
| 9,936,470 B2 | 4/2018 | Eyuboglu et al. |
| 9,961,688 B1 | 5/2018 | Anvari |
| 9,998,310 B2 | 6/2018 | Barbieri et al. |
| 10,057,916 B2 | 8/2018 | Barabell et al. |

(Continued)

FOREIGN PATENT DOCUMENTS

| | | |
|---|---|---|
| EP | 3152970 A2 | 4/2017 |
| EP | 3269118 A2 | 1/2018 |

(Continued)

OTHER PUBLICATIONS

Haberland et al., "Base Stations in the Cloud", ITG Fachtagung Wien, Sep. 28, 2012, pp. 1-23, Alcatel-Lucent.

(Continued)

*Primary Examiner* — Tejis Daya
(74) *Attorney, Agent, or Firm* — Fogg & Powers LLC

(57) ABSTRACT

One embodiment is directed to off-loading at least some of the baseband processing for signals received at or transmitted by at least one overloaded radio point to at least one other radio point so that the off-loaded baseband processing is performed by the at least one other radio point. The radio points are a part of a centralized or cloud radio access network (C-RAN) or similar system.

50 Claims, 6 Drawing Sheets

(56) References Cited

U.S. PATENT DOCUMENTS

| | | | |
|---|---|---|---|
| 10,064,072 | B2 | 8/2018 | Eyuboglu et al. |
| 10,097,391 | B2 | 10/2018 | Fertonani et al. |
| 10,355,895 | B2 | 7/2019 | Barbieri et al. |
| 10,536,959 | B2* | 1/2020 | Barabell ............ H04W 72/1263 |
| 2014/0161447 | A1* | 6/2014 | Graves ............... H04Q 11/0062 |
| | | | 398/48 |
| 2014/0219255 | A1* | 8/2014 | Eyuboglu ............. H04L 1/1812 |
| | | | 370/336 |
| 2014/0269364 | A1 | 9/2014 | Knapp et al. |
| 2014/0328178 | A1 | 11/2014 | Haberland et al. |
| 2016/0037550 | A1* | 2/2016 | Barabell ............. H04W 72/046 |
| | | | 455/450 |
| 2016/0119809 | A1* | 4/2016 | Lee ....................... H04W 28/02 |
| | | | 455/453 |
| 2016/0192181 | A1* | 6/2016 | Choi .................... H04B 17/382 |
| | | | 455/422.1 |
| 2017/0366403 | A1 | 12/2017 | Gawron et al. |
| 2017/0373890 | A1 | 12/2017 | Fertonani et al. |
| 2018/0287696 | A1* | 10/2018 | Barbieri ................ H04W 36/08 |
| 2018/0352561 | A1* | 12/2018 | Barabell ............. H04B 17/318 |
| 2019/0007246 | A1 | 1/2019 | Fertonani et al. |
| 2019/0116568 | A1 | 4/2019 | Fertonani et al. |
| 2019/0207575 | A1 | 7/2019 | Link et al. |
| 2019/0320487 | A1* | 10/2019 | Khan .................... H04B 7/0413 |
| 2020/0128414 | A1* | 4/2020 | Mishra ................. H04W 24/02 |

FOREIGN PATENT DOCUMENTS

| | | |
|---|---|---|
| WO | 2014201965 A1 | 12/2014 |
| WO | 2016145371 A2 | 9/2016 |
| WO | 2017070635 A1 | 4/2017 |
| WO | 2018017468 A1 | 1/2018 |
| WO | 2018208845 A1 | 11/2018 |

OTHER PUBLICATIONS

Zhu et al., "Virtual Base Station Pool: Towards a Wireless Network Cloud for Radio Access Networks", CF'10, May 2010, pp. 1-10, ACM.

International Searching Authority, "International Search Report and Written Opinion from PCT Application No. PCT/US2020/012610", from Foreign Counterpart to U.S. Appl. No. 16/736,659, dated Apr. 28, 2020, pp. 1 through 11, Published: WO.

Pateromichelakis et al., "Selection and Dimensioning of slice-based RAN Controller for adaptive Radio Resource Management", 2017 IEEE Wireless Communications and Networking Conference (WCNC), Mar. 2017, pp. 1 through 7, IEEE.

China Mobile Research Institute, "C-RAN the Road Towards Green RAN", White Paper Version 2.5, Oct. 1, 2011, XP-002700746, Page(s) Cover through 44, (c) 2011 CMCC.

European Patent Office, "Extended European Search Report from U.S. Appl. No. 16/736,659, filed Jul. 6, 2022", from Foreign Counterpart to U.S. Appl. No. 16/736,659, filed Jul. 6, 2022, pp. 1 through 9, Published: EP.

* cited by examiner

| SUBFRAME | LIST OF UES PICKED FOR CQI/SR ON A SPECIFIC TTI |
|---|---|
| SF=1 | UE1..UE8 |
| SF=21 | UE9..UE16 |
| SF=41 | UE17..UE24 |
| SF=61 | UE25..UE32 |
| SF=81 | UE33..UE36,  UE1...UE4 |

FIG. 3

|  | HARQ | SR | RI | CQI | TOTAL |
|---|---|---|---|---|---|
| RP1 | 6 | 16 | 8 | 12 | 42 |
| RP2 | 5 | 15 | 3 | 10 | 33 |
| RP3 | 4 | 10 | 2 | 19 | 35 |
| RP20 | 1 | 1 | 0 | 0 | 2 |
| RP21 | 0 | 1 | 0 | 1 | 2 |
| RP30 | 6 | 22 | 4 | 22 | 54 |
| RP31 | 5 | 17 | 7 | 17 | 46 |
| RP32 | 3 | 0 | 0 | 3 | 6 |

FIG. 4

|  | HARQ | SR | RI | CQI | TOTAL |  |
| --- | --- | --- | --- | --- | --- | --- |
| RP30 | 6 | 22 | 4 | 22 | 54 | ← OLRP1 |
| RP31 | 5 | 17 | 7 | 17 | 46 | ← OLRP2 |
| RP1 | 6 | 16 | 8 | 12 | 42 | ← OLRP3 |
| RP3 | 4 | 10 | 2 | 19 | 35 |  |
| RP2 | 5 | 15 | 3 | 10 | 33 |  |
| RP32 | 3 | 0 | 0 | 3 | 6 | ← ULRP3 |
| RP20 | 1 | 1 | 0 | 0 | 2 | ←ULRP2 |
| RP21 | 0 | 1 | 0 | 1 | 2 | ←ULRP1 |

Average:    30.375

FIG. 5

DISTRIBUTED PHYSICAL-LAYER PROCESSING BY REMOTE UNITS OF CLOUD/CENTRALIZED RADIO ACCESS NETWORK (C-RAN)

CROSS-REFERENCE TO RELATED APPLICATIONS

This application claims the benefit of U.S. Provisional Patent Application Ser. No. 62/789,903, filed on Jan. 8, 2019, which is hereby incorporated herein by reference in its entirety.

BACKGROUND

A cloud radio access network (C-RAN) (also sometimes referred to as a centralized radio access network) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each controller is coupled to the radio points over front-haul communication links or a front-haul network.

In some C-RAN configurations, at least some of the physical layer (Layer 1) baseband processing is performed at the RPs. Each RP is configured so that it is able to perform a given maximum amount of baseband processing for each transmission time interval (TTI) (or other scheduling interval). However, in some situations, so many UEs may come within the coverage area of a given RP that the amount of baseband processing that would typically need to be performed by the RP for a TTI would exceed this maximum. Such an RP is also referred to here as being "overloaded" and is also referred to here as an "overloaded" RP.

There are conventional ways of dealing with an overloaded RP. When a scheduler determines that an RP is overloaded for a given TTI, the scheduler can identify those UEs for which baseband processing is being performed by the overloaded RP during that TTI. Then, the scheduler can identify which of those UEs are also being served by other RPs that are not overloaded during that TTI. The scheduler can then cause baseband processing for at least some of those identified UEs to not be performed at the overloaded RP during that TTI and instead rely on the other RPs serving those UEs for that TTI. Also, for those UEs that are not also being served by other RPs, the scheduler can be configured to defer some baseband processing at that overloaded RP for one or more UEs by scheduling the associated activity to be performed during later TTIs instead of during the current TTI. However, these conventional ways of dealing with an overloaded RP may impair the service provided to the affected UEs.

SUMMARY

One embodiment is directed to a system to provide wireless service. The system comprising at least one controller and a plurality of radio points. Each of the radio points is associated with at least one antenna and remotely located from the controller, wherein the plurality of radio points is communicatively coupled to the controller. The controller and the plurality of radio points are configured to implement at least one base station in order to provide wireless service to a plurality of user equipment (UEs) using at least one cell. The controller is communicatively coupled to a core network of a wireless service provider. The controller is configured to: determine, for a scheduling interval, an initial resource allocation to one or more UEs for one or more wireless channels used to serve said at least one cell; determine, for the initial resource allocation, initial baseband processing loads for performing baseband processing for signals received at or transmitted by the radio points serving said at least one cell; identify one or more radio points that are overloaded for said scheduling interval based on the initial baseband processing loads; and off-load at least some of the baseband processing for signals received at or transmitted by at least one overloaded radio point to at least one other radio point so that the off-loaded baseband processing is performed by said at least one other radio point.

Another embodiment is directed to a method of load balancing baseband processing in a wireless system comprising at least one controller and a plurality of radio points. Each of the radio points is associated with at least one antenna and remotely located from the controller. The plurality of radio points is communicatively coupled to the controller. The controller and the plurality of radio points are configured to implement at least one base station in order to provide wireless service to a plurality of user equipment (UEs) using at least one cell. The controller is communicatively coupled to a core network of a wireless service provider. The method comprises determining, for a scheduling interval, an initial resource allocation to one or more UEs for one or more wireless channels used to serve said at least one cell. The method further comprises determining, for the initial resource allocation, initial baseband processing loads for performing baseband processing for signals received at or transmitted by the radio points serving said at least one cell. The method further comprises identifying one or more radio points that are overloaded for said scheduling interval based on the initial baseband processing loads and off-loading at least some of the baseband processing for signals received at or transmitted by at least one overloaded radio point to at least one other radio point so that the off-loaded baseband processing is performed by said at least one other radio point.

Other embodiments are disclosed.

The details of various embodiments are set forth in the accompanying drawings and the description below. Other features and advantages will become apparent from the description, the drawings, and the claims.

DRAWINGS

Figure 2:
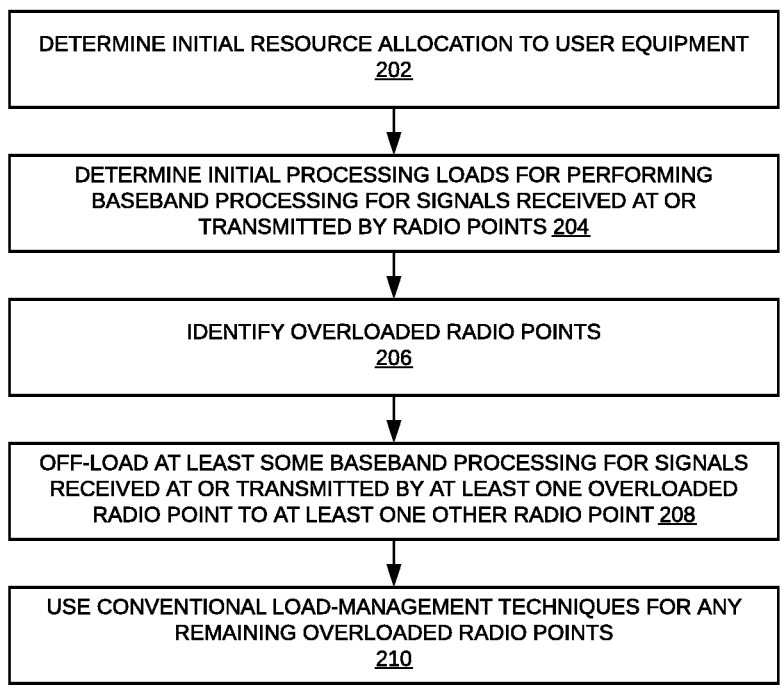

FIG. 2 comprises a high-level flowchart illustrating one exemplary embodiment of a method of load balancing baseband processing in radio points of a C-RAN.

FIG. 3 illustrates an example of the results of using conventional load-management techniques where all scheduled UEs include the same radio point in their combining zone.

FIG. 4 illustrates an example of the results of determining the overall baseband processing load for each radio point by counting the amount of baseband processing that would need to be performed for the HARQ, SR, CQI, and RI PUCCH resources initially allocated to all scheduled UEs that receive uplink signals from that radio point.

FIG. 5 illustrates an example of the results of sorting the RPs based on the total amount of HARQ, SR, and CQI PUCCH resources allocated to that RP 106 for the current TTI.

Figure 1A:
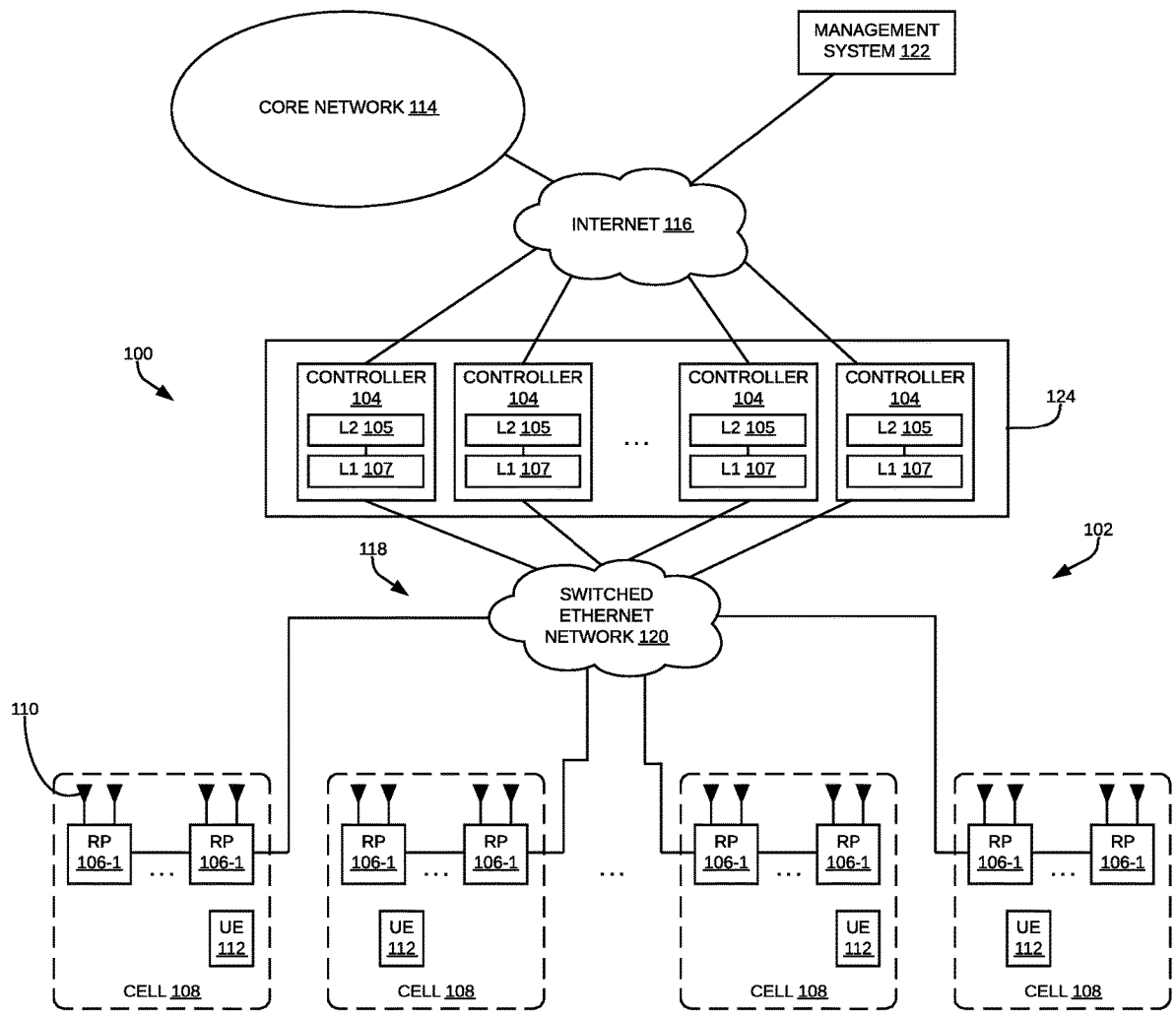
FIG. 1A is a block diagram illustrating one exemplary embodiment of a radio access network (RAN) system 100 in which the radio-point load-management techniques described here can be used.
Figure 1B:
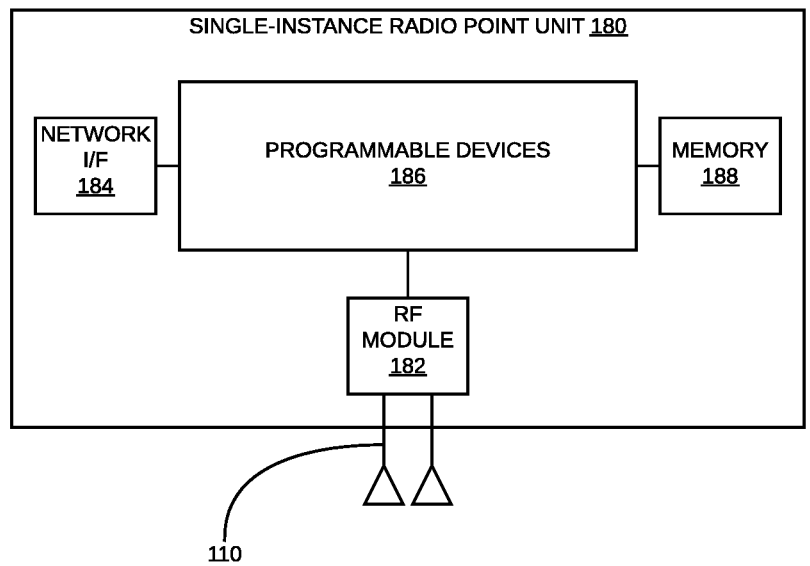
FIG. 1B is a block diagram illustrating one exemplary embodiment of a single-instance radio point unit that can be used to implement a single instance of a radio point of the C-RAN of FIG. 1A.
Figure 1C:
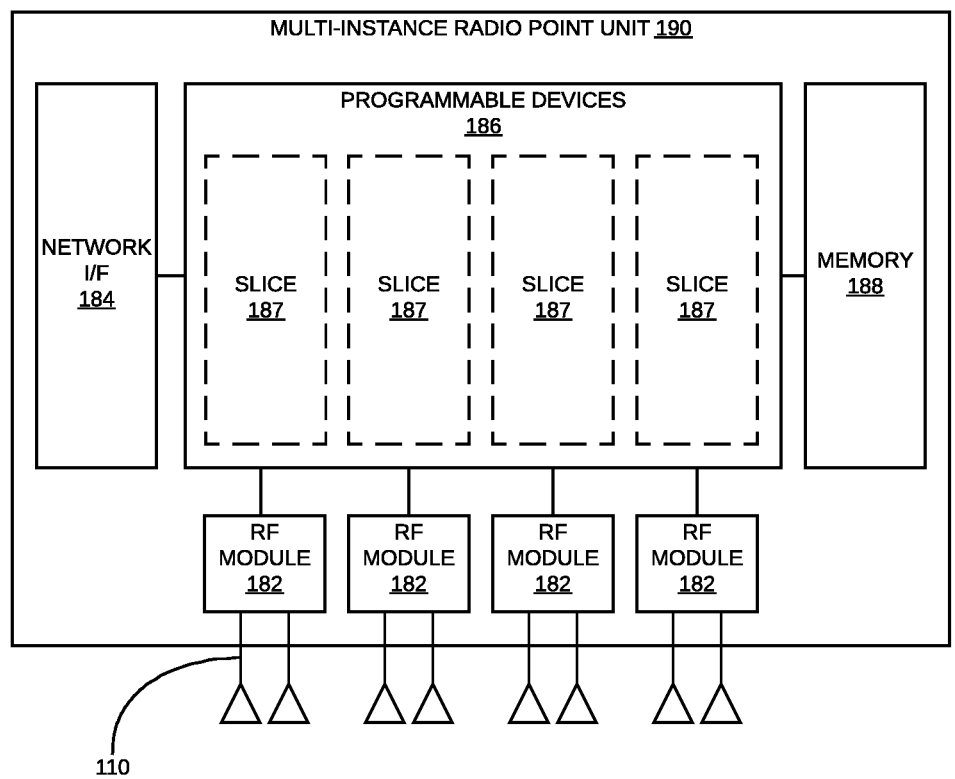
FIG. 1C is a block diagram illustrating one exemplary embodiment of a multiple-instance radio point unit that can be used to implement one or more instances of a radio point for one or more C-RANs of the type shown in FIG. 1A.
Figure 6:
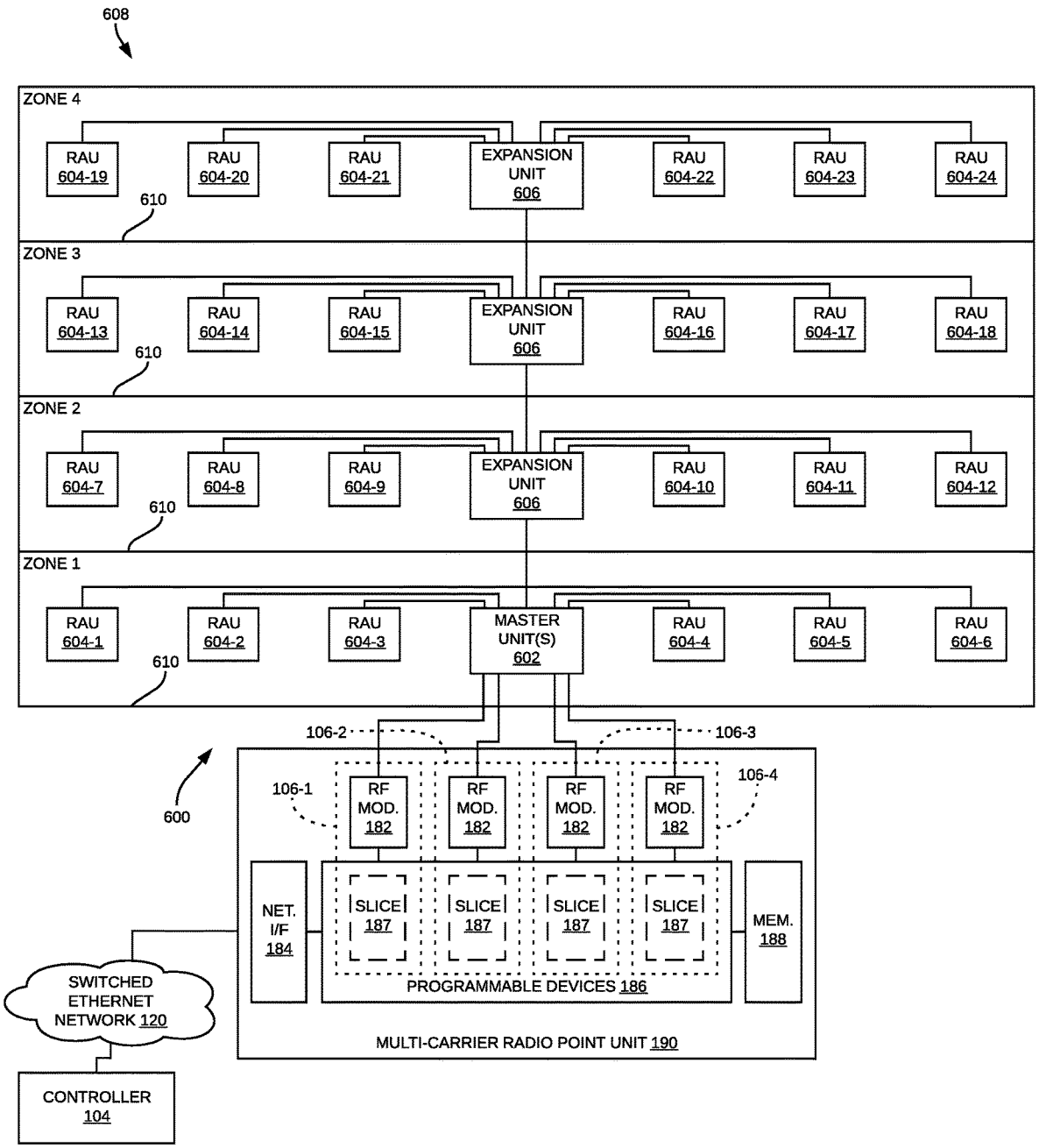

FIG. 6 illustrates a usage scenario in which one or more instances of a radio point implemented by a multiple-instance radio point unit as shown in FIG. 1C are used to interface the C-RAN system to a distributed antenna system (DAS).

Like reference numbers and designations in the various drawings indicate like elements.

DETAILED DESCRIPTION

FIG. 1A is a block diagram illustrating one exemplary embodiment of a radio access network (RAN) system 100 in which the radio-point load-management techniques described here can be used. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1A, the system 100 is implemented at least in part using a C-RAN architecture that employs one or more baseband units 104 and multiple radio points (RPs) 106. The system 100 is also referred to here as a "C-RAN system" 100. Each RP 106 is remotely located from the one or more baseband units 104. Also, in this exemplary embodiment, at least one of the RPs 106 is remotely located from at least one other RP 106. The baseband units 104 and RPs 106 serve at least one cell 108. The baseband units 104 are also referred to here as "baseband controllers" 104 or just "controllers" 104. Each controller 104 performs various functions for the cell 108 including, without limitation, Layer-2 functionality 105 and Layer-1 functionality 107.

Each RP 106 includes or is coupled to one or more antennas 110 via which downlink RF signals are radiated to various items of user equipment (UE) 112 and via which uplink RF signals transmitted by UEs 112 are received.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

The system 100 is coupled to the core network 114 of each wireless network operator over an appropriate back-haul. In the exemplary embodiment shown in FIG. 1A, the Internet 116 is used for back-haul between the system 100 and each core network 114. However, it is to be understood that the back-haul can be implemented in other ways.

The exemplary embodiment of the system 100 shown in FIG. 1A is described here as being implemented as a Long Term Evolution (LTE) radio access network providing wireless service using an LTE air interface. LTE is a standard developed by the 3GPP standards organization. In this embodiment, the controllers 104 and RPs 106 together are used to implement one or more LTE Evolved Node Bs (also referred to here as an "eNodeBs" or "eNBs") that are used to provide user equipment 112 with mobile access to the wireless network operator's core network 114 to enable the user equipment 112 to wirelessly communicate data and voice (using, for example, Voice over LTE (VoLTE) technology). These eNodeBs can be macro eNodeBs or home eNodeBs (HeNB).

Also, in this exemplary LTE embodiment, each core network 114 is implemented as an Evolved Packet Core (EPC) 114 comprising standard LTE EPC network elements such as, for example, a mobility management entity (MME) and a Serving Gateway (SGVV) (all of which are not shown). Each controller 104 communicates with the MME and SGW in the EPC core network 114 using the LTE S1 interface. Also, each controller 104 communicates with other eNodeBs using the LTE X2 interface. For example, each controller 104 can communicate via the LTE X2 interface with an outdoor macro eNodeB (not shown) or another controller 104 in the same cluster 124 (described below) implementing a different cell 108. Although the exemplary embodiment of the system 100 shown in FIG. 1A is described here as being implemented as an LTE system, it is to be understood that the techniques described here can be implemented in systems that implement other protocols such as systems that implement Fifth Generation New Radio (5G NR) protocols or other protocols developed by the 3GPP standards organization or systems that implement Citizens Broadband Radio Service (CBRS) band protocols developed by the CBRS Alliance.

If the eNodeB implemented using one or more controllers 104 is a home eNodeB, the core network 114 can also include a Home eNodeB Gateway (not shown) for aggregating traffic from multiple home eNodeBs.

Each controller 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controllers 104 and the radio points 106 can implement one or more of the LTE transmission modes using licensed and/or unlicensed RF bands or spectrum. Moreover, the controllers 104 and/or the radio points 106 can be configured to support multiple wireless protocols, multiple carriers, and/or multiple wireless operators.

Each controller 104 is communicatively coupled to the radio points 104 using a front-haul network 118. In the exemplary embodiment shown in FIG. 1A, the front-haul 118 that communicatively couples each controller 104 to one or more RPs 106 is implemented using a standard switched ETHERNET network 120. However, it is to be understood that the front-haul between the controllers 104 and RPs 106 can be implemented in other ways.

In the exemplary embodiment shown in FIG. 1A, a management system 122 is communicatively coupled to the controllers 104 and RPs 106, for example, via the Internet 116 and ETHERNET network 120 (in the case of the RPs 106).

In the exemplary embodiment shown in FIG. 1A, the management system 122 communicates with the various elements of the system 100 using the Internet 116 and the ETHERNET network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Generally, for each cell 108 implemented by the C-RAN 100, the corresponding controller 104 performs the air-interface Layer-3 (L3) and Layer-2 (L2) processing as well as at least some of the air-interface Layer-1 (L1) processing for the cell 108, where each of the radio points 106 serving that cell 108 perform the L1 processing not performed by the controller 104 as well as implementing the analog RF transceiver functions.

Different splits in the air-interface processing between each controller 104 and the radio points 106 can be used. In one example, the data front-hauled between the controller 104 and the RPs 106 is communicated as IQ data representing frequency-domain symbols for the air interface. This frequency-domain IQ data represents the symbols in the frequency domain before the inverse fast Fourier transform (IFFT) is performed, in the case of the downlink, and after the fast Fourier transform (FFT) is performed, in the case of the uplink. If this L1 split is used for downlink data, the IFFT and subsequent transmit L1 processing would be performed in each RP 106. Also, if this L1 split is used for uplink data, the FFT would be performed in each RP 106 and subsequent receive L1 processing would be performed in the controller 104.

Other splits can be used and data can communicated between the controllers 104 and the radio points 106 in other formats. In the following the description, the fronthaul data communicated between the controllers 104 and the radio points 106 for the air interface is generally referred to as "IQ data" even though such fronthaul data can take many forms, including forms that are not IQ data.

The split in the air-interface processing between each controller 104 and the radio points 106 used for the downlink can be different from the split used for the uplink. Also, for a given direction (downlink or uplink), the same split need not be used for all resources (for example, different splits can be used for different channels or for different resource blocks). Likewise, the form in which front-haul data is communicated in the downlink direction (that is, the direction from the controller 104 to the RPs 106) can differ from the form in which front-haul data is communicated in the uplink direction (that is, the direction from the RPs 106 to the controller 104). Also, for a given direction (downlink or uplink), not all front-haul data needs to be communicated in the same form (that is, the front-haul data for different channels or for different resource blocks can be communicated in different ways).

In the example described here in connection with FIG. 1A, each radio point 106 can be implemented using a single-instance radio point unit 180 as shown in FIG. 1B or as a multiple-instance radio point unit 190 as shown in FIG. 1C.

FIG. 1B is a block diagram illustrating one exemplary embodiment of a single-instance radio point unit 180 that can be used to implement a single instance of a radio point 106 of the C-RAN 100 of FIG. 1A.

In this exemplary embodiment, the single-instance radio point unit 180 comprises a single radio frequency (RF) module 182. The RF module 182 comprises circuitry that implements the RF transceiver functions for a single instance of a radio point 106 and provides an interface to one or more antennas 110 associated with that instance of the radio point 106. More specifically, in the exemplary embodiment shown in FIG. 1B, each RF module interfaces 182 with a respective two antennas 110.

Each RF module 182 comprise circuitry that implements, for the associated instance of a radio point 106, two downlink signal paths, one for each of the two antennas 110, and two uplink signals paths, one for each of the two antennas 110. In one exemplary implementation, each downlink signal path comprises a respective digital-to-analog converter (DAC) to convert downlink digital samples to a downlink analog signal, a respective frequency converter to upconvert the downlink analog to a downlink analog RF signal at the desired RF frequency, and a respective power amplifier (PA) to amplify the downlink analog RF signal to the desired output power for output via the antenna 110 associated with that downlink signal path. In one exemplary implementation, each uplink signal path comprises a respective low-noise amplifier (LNA) for amplifying an uplink analog RF signal received via the antenna 110 associated with the uplink signal path, a respective frequency converter to down-convert the received uplink analog RF signal to an uplink analog baseband frequency signal, a respective analog-to-digital converter (ADC) to convert the uplink analog baseband frequency signal to uplink digital samples. Each of the downlink and uplink signal paths can also include other conventional elements such as filters. Each RF module can be implemented using one or more RF integrated circuits (RFICs) and/or discrete components.

The single-instance radio point unit 180 further comprises at least one network interface 184 that is configured to communicatively couple the single-instance radio point unit 180 to the front-haul network 118. More specifically, in the exemplary embodiment shown in FIG. 1B, the network interface comprises an ETHERNET network interface that is configured to communicatively couple that single-instance radio point unit 180 to the switched ETHERNET network 120 that is used to implement the front-haul 118 for the C-RAN 100.

The single-instance radio point unit 180 further comprises one or more programmable devices 186 that execute, or are otherwise programmed or configured by, software, firmware, or configuration logic in order to implement Layer-1 baseband processing described here as being performed by the instance of a radio point 106 implemented using that single-instance radio point unit 180. The one or more programmable devices 186 can be implemented in various ways (for example, using programmable processors (such as microprocessors, co-processors, and processor cores integrated into other programmable devices), programmable logic (such as field programmable gate arrays (FPGA), and system-on-chip packages)). Where multiple programmable devices are used, all of the programmable devices do not need to be implemented in the same way. In the exemplary embodiment shown in FIG. 1B, memory 188 included in the radio point unit 180 is used by the programmable devices 186. Memory 188 can comprise memory that is integrated into and/or that is external to the programmable devices 186 (as illustrated in FIG. 1B).

FIG. 1C is a block diagram illustrating one exemplary embodiment of a multiple-instance radio point unit 190 that can be used to implement one or more instances of a radio point 106 for one or more C-RANs 100 of the type shown in FIG. 1A.

In this exemplary embodiment, the multiple-instance radio point unit 190 comprises multiple RF modules 182. In general, each RF module 182 is implemented as described above in connection with FIG. 1B, except that the multiple radio point unit 190 includes multiple RF modules 182 instead of a single RF module 182. In one implementation of the embodiment shown in FIG. 1C, one RF module 182 is used for each instance of a radio point 106 that is implemented using the multiple-instance radio point unit 190.

The multiple-instance radio point unit 190 further comprises at least one network interface 184 that is configured to communicatively couple the multiple-instance radio point unit 190 to the fronthaul network 118 of each C-RAN 100 with which the unit 190 is being used. In general, each RF module 182 is implemented as described above in connection with FIG. 1B.

The multiple-instance radio point unit 190 further comprises one or more programmable devices 186 and memory 188. In general, the one or more programmable devices 186 and memory 188 included in the multiple-instance radio point unit 190 are implemented as described above in connection with FIG. 1B, except that the programmable devices 186 and memory 188 are scaled so as to be able implement multiple instances of a radio point 106 instead of only a single instance of a radio point 106, as is the case with the single-instance radio point unit 180 of FIG. 1B.

In the exemplary embodiment shown in FIG. 1C, each of the multiple instances of a radio point 106 implemented using the multiple-instance radio point unit 190 can be implemented using a separate "slice" 187 of the programmable devices 186 that are dedicated to implementing that radio point instance. However, in order to support efficient communications between different radio points instances implemented on the same multiple-instance radio point unit 190, the multiple-instance radio point unit 190 can be configured so that at least some of the memory 188 is shared among the slices 187 used to implement the various radio instances. As a result, the various radio point instances implemented by a single multiple-instance radio point unit 190 are able to communicate with each other using internal messaging (via the shared memory 188), thereby avoiding the need for such communications to occur over the fronthaul network 118.

The multiple-instance radio point unit 190 is configured to implement multiple instances of a radio point 106, where each such radio point instance appears to the associated serving controller 104 as a separate logical radio point 106. Each instance of a radio point 106 is implemented using one or more RF modules 182 and one or more slices 187 of the programmable devices 186. For example, in the embodiment shown in FIG. 1C, a 2×2 MIMO instance of a radio point 106 can be implemented using a single RF module 182 and a single slice 187 of the programmable devices 186, whereas a 4×4 MIMO instance of a radio point 106 can be implemented using two RF modules 182 and two slices 187 of the programmable devices 186. Other examples and embodiments can be implemented in other ways.

In one usage scenario, the multiple-instance radio point unit 190 shown in FIG. 1C can be used to couple the C-RAN system 100 to a distributed antenna system (DAS) as is described in more detail below in connection with FIG. 6. In this usage scenario, the multiple-instance radio point unit 190 is used to implement multiple instances of a radio point 106 for a single C-RAN 100, with all of the instances being used with the same C-RAN 100 to serve the same cell 108 (using the same center frequency) and with each instance being coupled to a different zone of the DAS. In another usage scenario, the multiple-instance radio point unit 190 shown in FIG. 1C can be used to implement multiple instances of a radio point 106 for multiple C-RANs 100 of the type shown in FIG. 1A, with each instance being used in a different C-RAN 100 to serve a different cell 108 (using a different center frequency).

Referring again to FIG. 1A, in this example, the "simulcast zone" for a particular UE 112 is the set of one or more RPs 106 from which downlink transmissions intended for a particular UE 112 are made. Likewise, in this example, the "combining zone" for a particular UE 112 is the set of one or more RPs 106 that forward, to the appropriate controller 104, Layer-1 data for uplink transmissions received from that UE 112. The simulcast zone and combining zone for a particular UE 112 do not necessarily need to include the same RPs 106. Also, the simulcast zone and combining zone need not be used for all channels or for all resources within a given channel.

In the exemplary embodiment described here in connection with FIG. 1A, the simulcast zone and combining zone for each UE 112 are determined by the serving controller 104 using a "signature vector" (SV) associated with that UE 112. In this embodiment, a signature vector is determined for each UE 112. The signature vector is determined based on receive power measurements for uplink transmissions from each UE 112 made at each of the RPs 106 serving a given cell 108.

When a UE 112 makes initial Physical Random Access Channel (PRACH) transmissions to access a cell 108, each RP 106 will receive those initial PRACH transmissions and a signal reception metric indicative of the power level of the PRACH transmissions received by that RP 106 is measured (or otherwise determined). One example of such a signal reception metric is a signal-to-interference-plus-noise-ratio (SINR). The signal reception metrics that are determined based on the PRACH transmissions are also referred to here as "PRACH metrics."

Each signature vector is determined and updated over the course of that UE's connection to the cell 108 based on Sounding Reference Signals (SRS) transmitted by the UE 112. A signal reception metric indicative of the power level of the SRS transmissions received by the RPs 106 (for example, a SINR) is measured (or otherwise determined). The signal reception metrics that are determined based on the SRS transmissions are also referred to here as "SRS metrics."

The signature vector can be used to determine the RP 106 having the best signal reception metric by scanning or sorting the elements of the signature vector to find the element having the best signal reception metric. The RP 106 that corresponds to that "best" element is also referred to here as the "primary RP 106" for the UE 112. The signature vector for each UE 112 can also be used to determine the simulcast zone and the combining zone for that UE 112. In general, the simulcast zone and combining zone can be determined by selecting those RPs 106 having corresponding signal reception metrics that are above a predetermined threshold and/or satisfy some other condition. A preliminary simulcast zone or combining zone determined for a UE 112 can also be expanded to include additional RPs 106 or shrunk to include fewer RPs 106 based on other considerations.

FIG. 2 comprises a high-level flowchart illustrating one exemplary embodiment of a method 200 of load balancing baseband processing in radio points of C-RAN. The embodiment of method 200 shown in FIG. 2 is described here as being implemented using the C-RAN 100 described above in connection with FIG. 1A, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling. Moreover, one or more aspects of method 200 can be configurable or adaptive (either manually or in an automated manner). For example, various measurements or statistics can be captured and used to fine tune the method 200.

The particular transmission time interval (TTI) (or other scheduling interval) for which method 200 is described here as being performed is referred to here as the "current" TTI (or other scheduling interval).

Method 200 can be performed for one or more uplink or downlink channels. For example, in an LTE embodiment, method 200 can be performed for one or more of the following: Physical Downlink Shared Channel (PDSCH), a Physical Downlink Control Channel (PDCCH), a Physical HARQ Indicator Channel (PHICH), a Physical Control Format Indicator Channel (PCFICH), a Physical Broadcast Channel (PBCH), a Physical Uplink Shared Channel (PUSCH), a Physical Uplink Control Channel (PUCCH), a Physical Random Access Channel (PRACH), and Sounding Reference Signals (SRS). In other embodiments, method 200 can be performed for other channels (including other channels implemented by other protocols or systems). The particular set of one or more channels for which method 200 is described here as being performed is referred to here as the "current" set of channels.

In this exemplary embodiment, each RP 106 has an associated overloaded threshold value. The overloaded threshold value is set to correspond to a maximum amount of baseband processing that the RP 106 is able to successfully perform for the current TTI (or other scheduling interval) and for the current set of channels.

Method 200 comprises determining, for the current TTI, an initial resource allocation to one or more UEs 112 for one or more wireless channels used to serve said at least one cell (block 202). In one implementation, the Layer-2 functionality 105 in the serving controller 104 uses its normal scheduling and resource allocation routines to do this.

Method 200 further comprises determining, for the initial resource allocation, initial processing loads for performing baseband processing for signals received at or transmitted by the radio points 106 serving the current cell 108 (block 204). In one implementation, the Layer-2 functionality 105 uses the simulcast zones for the scheduled UEs 112 (if downlink channels are being scheduled) or the combining zones for the scheduled UEs 112 (if uplink channels are being scheduled) to determine which RPs 106 transmit downlink signals or receive uplink signals for each scheduled UE 112. The Layer-2 functionality 105 then calculates the overall baseband processing load for each RP 106 by aggregating the amount of baseband processing that would need to be performed for the resources initially allocated to all scheduled UEs 112 that transmit downlink signals or receive uplink signals from that RP 106.

Method 200 further comprises identifying one or more radio points 106 that are overloaded for the current TTI based on the initial baseband processing loads (block 206). In one implementation, the Layer-2 functionality 105 does this by using the baseband processing loads determined for the RPs 106 to determine which RPs 106 have a baseband processing load that exceeds the overloaded threshold.

Method 200 further comprises off-loading at least some of the baseband processing for signals received at or transmitted by at least one overloaded radio point 106 to at least one other radio point 106 so that the off-loaded baseband processing is performed by said at least one other radio point 106 (block 208).

In one implementation, the Layer-2 functionality 105 can do this by identifying RPs 106 that, under the initial resource allocation, have a meaningful amount of unused baseband processing capacity for the current TTI and for the current set of channels. The RPs 106 that have a meaningful amount of unused baseband processing capacity are also referred to here as "underloaded" RPs 106. Then the Layer-2 functionality 105 can re-allocate that unused baseband processing capacity to offload the overloaded RPs 106 so that the underloaded RPs 106 can perform a portion of the baseband processing associated with signals received at or transmitted by one or more overloaded RPs 106. Any suitable resource allocation scheme can be used to perform that re-allocation.

In the exemplary embodiment shown in FIG. 2, method 200 further comprises using conventional load-management techniques to address any RPs 106 that are still overloaded after the off-loading determinations described above have been made. (block 210). In one implementation, the Layer-2 functionality 105 can use conventional load-management techniques (for example, the ones described above) to address any RPs 106 that are still overloaded after the off-loading determinations described above have been made.

Then, the Layer-2 functionality 105 sends appropriate commands to the overloaded and underloaded RPs 106 to implement the offloading it has determined. For uplink channels, RF signals are received at each overloaded RP 106 (via the antennas 110 associated with that RP 106) and generates digital baseband data from the received signals. In general, the overloaded RP 106 will perform any baseband processing that has not been offloaded and forwards the resulting baseband data to the appropriate underloaded RP 106 that is performing the off-loaded baseband processing in place of that overloaded RP 106. The underloaded RP 106 receives the baseband information and performs the off-loaded baseband processing. After the underloaded RP 106 has performed the off-loaded baseband processing for the overloaded RP 106, the resulting decoded baseband data is communicated over the fronthaul network 118 to the serving controller 104. In one example, the overloaded RP 106 can perform the basic UE-agnostic baseband processing (such as the cyclic prefix (CP) removal and Fast Fourier Transform (FFT)) and send the resulting baseband data to the underloaded RP 106. In such example, the underloaded RP 106 performs the remaining baseband processing (including, for example, channel and noise estimation, symbol decoding, and SINR calculations), and sends the resulting data to the controller 104.

For downlink channels, baseband and channel-specific data is communicated from the serving controller 104 (via its Layer-1 functionality 107) over the fronthaul network 118 to the underloaded RP 106 that is performing the off-loaded baseband processing in place of a corresponding overloaded RP 106. The underloaded RP 106 receives the baseband data for the signals to be transmitted from the overloaded RP 106 and performs the off-loaded baseband processing. After the underloaded RP 106 has performed the off-loaded baseband processing for the signals to be transmitted from the overloaded RP 106, the resulting baseband data is communicated to the corresponding overloaded RP 106, which uses the resulting baseband data to perform any remaining baseband processing that needs to be performed and generates RF signals for radiating from the antennas 110 associated with that overloaded RP 106. In one example, the underloaded RP 106 can perform steps like pre-coding, modulation, rate-matching, etc. and send the resulting baseband data to the overloaded RP 106, which performs the UE-agnostic processing (such as resource element mapping and inverse Fast Fourier Transform (IFFT) processing) and finally transmits the radio frequency signals over the air via its associated antennas 110 to the UEs 112.

The baseband data can be communicated between the overloaded RP 106 and the underloaded RP 106 via the fronthaul network 118. However, where the overloaded RP 106 and the underloaded RP 106 are implemented as instances of a radio point 106 on the same multiple-instance radio point unit 190 as described above in connection with FIG. 10, the baseband data can be communicated between the overloaded RP 106 (implemented by one slice 187) and the underloaded RP 106 (implemented by another slice 187) using internal messaging via the shared memory 188, thereby avoiding the need for such communications to occur over the fronthaul network 118. This also avoids the latency associated with communicating over the fronthaul network 118 and the resulting reduction of bandwidth available for other communications over the fronthaul network 118.

In one example, baseband processing for signals received at or transmitted by a single overloaded RP 106 is offloaded, using method 200, to a single underloaded RP 106. In other embodiments, baseband processing for signals received at or transmitted by a single overloaded RP 106 is offloaded, using method 200, to multiple underloaded RPs 106. In other embodiments, baseband processing for signals received at or transmitted by multiple overloaded RPs 106 is offloaded, using method 200, to a single underloaded RPs 106. Also, in other embodiments, baseband processing for signals received at or transmitted by multiple overloaded RPs 106 is offloaded, using method 200, to multiple underloaded RPs 106.

By offloading some baseband processing from overloaded RPs 106 to underloaded RPs 106, RP-specific processing limits can be addressed without impairing service provided to UEs 112. Also, the processing load on the controller 104 for implementing the conventional RP-load-management techniques can be reduced. More generally, configuring the C-RAN 100 to support offloading some baseband processing from overloaded RPs 106 to underloaded RPs 106 can result in more efficient processing resource utilization (which can reduce the amount of processing resources that need to be deployed in the C-RAN 100 and the associated connectivity and costs).

In one example, an existing multiple-instance radio point unit 190 is configured to support two carriers with the programmable devices 186 scaled to provide sufficient processing capacity for two slices to implement up to two radio point instances. The original design of such an existing multiple-instance radio point unit 190 can be easily extended to support four carriers and four radio point instances by including two additional RF modules 182 in the unit 190 while using the existing programmable devices 186. This is done by reconfiguring to the programmable devices 186 to use four slices to implement up to four radio point instances, instead of two. In this example, the processing capacity of the programmable devices 186 is not increased. As a result, the processing capacity may not be sufficient to provide the same amount of baseband processing for four radio point instances as was the case when only two radio point instances were supported. However, the offloading techniques described here can be used to offload baseband processing from one multiple carrier radio point units 190 to other multiple-instance radio point units 190. In this way, an existing, tested design for a two-carrier multiple-instance radio point unit 190 can be easily extended to support four carriers and four radio point instances, without the need to increase the processing capacity of the programmable devices 186 included in the unit 190. It is to be understood that this is just one example and that a different number of carriers and radio point instances can be supported in other examples (for example, in the original radio point unit configuration and/or in the extended radio point unit configuration).

In this example, method 200 is used to offload baseband processing for PUCCH signals received at the RPs 106. This is because offloading baseband processing for PUCCH signals received at the RPs 106 is likely to result in meaningful reductions in baseband processing that is performed at overloaded RPs 106 and result in better quality of service and higher capacity for UEs 112 under the overloaded RPs 106.

In this LTE example, every UE 112 is allocated a respective specific time-domain instance (subframe-config), frequency-domain instance (physical resource block (PRB)) and resource index (cyclic shift and orthogonal sequence) for each Scheduling Request (SR) and Channel Quality Indication (CQI) on the PUCCH channel. These are allocated when the UE 112 attaches to the cell 108 or on an as-needed basis, whenever the UE 112 is reconfigured by the serving controller 104. At every instance, when a UE 112 triggers its SR and CQI signaling, the serving controller 104 commands the RPs 106 in that UE's combining zone to perform PUCCH channel decoding and the Layer-1 functionality 107 selects the best results and sends it to the Layer-2 functionality 105 in the controller 104. The results of this processing are also used for UE-specific uplink and downlink data scheduling.

Similarly, whenever a downlink packet is scheduled for transmission to a UE 112, four TTI's later, the controller 104 commands the RPs 106 in that UE's combining zone to process each hybrid automatic repeat request (HARQ) acknowledgment (ACK), negative acknowledgement (NACK), or discontinuous transmission (DTX) (collectively referred to here as a "HARQ feedback indication"). Those RPs 106 decode the channel and send each HARQ feedback indication (be it a HARQ ACK, HARQ NACK, or HARQ DTX) to the Layer-1 functionality 107 in the serving controller 104. The Layer-1 functionality 107 consolidates the HARQ feedback indications and passes them on to the Layer-2 functionality 105 for further scheduling decisions.

The baseband processing of HARQ, SR, and CQI PUCCH resources is important to the operations performed by the Layer-2 functionality 105 in the serving controller 104 (such as Layer-2 scheduling decisions).

The controller 104 has a specific amount of HARQ, SR, and CQI PUCCH resources that can be processed in every TTI. Likewise, each RP 106 has a specific amount of HARQ, SR, and CQI PUCCH resources that can be processed in every TTI. The amount of HARQ, SR, and CQI PUCCH resources that can be processed in every TTI by the controller 104 is typically much higher than the amount of HARQ, SR, CQI PUCCH resources that can be processed in every TTI by that RP 106.

If a very large number of UEs 112 come to be located near a particular RP 106, and, as a result, have that RP 106 be included in their combining zones, the amount of baseband processing that would need to be performed during a given TTI for the HARQ, SR, and CQI PUCCH resources allocated to UEs 112 that have that RP 106 in their combining zone may exceed the maximum amount of such baseband processing that the RP 106 can perform during a TTI, even though the corresponding maximum for the controller 104 is not. This can happen in C-RAN deployments in office buildings, shopping areas, or stadiums, where areas such as conference rooms, cafeterias, parking-lot areas, can suddenly attract more UEs 112 near specific RPs 106 and, as a result, those RPs 106 can become overloaded.

A very large number of UEs 112 can have a given RP 106 included in their combining zones when a RP 106 is used to couple the C-RAN system 100 to a distributed antenna system (DAS). More details regarding this usage scenario is described below in connection with FIG. 6. A DAS is a repeater system which, in such a configuration, effectively expands the coverage area of C-RAN 100 that serves as a source for the DAS. Because of this, it is more likely that a very large number UEs 112 have the RP 106 used to couple the C-RAN 100 to the DAS included in their combining zones, which can cause that RP 106 to become overloaded.

A very large number of UEs 112 can have a given RP 106 included in their combining zones in a laboratory setting when a multi-UE simulator system (like the Aeroflex TM500 simulator system) is used with a limited number of RPs 106 for capacity testing a C-RAN 100. Doing this will cause a heavy load on those RPs 106, which results in those RPs 106 becoming overloaded.

When an RP 106 becomes overloaded for baseband processing of HARQ, SR, and CQI PUCCH resources for a given TTI, the Layer-2 functionality 105 in the serving controller 104 can use conventional load-management techniques of the type described above in order to reduce the amount of baseband processing of HARQ, SR, and CQI PUCCH resources that is performed by the RP 106 during the TTI. When applying such conventional load-management techniques, the Layer-2 functionality 105 can prioritize the processing of HARQ, SR, and CQI PUCCH resources by giving the processing of HARQ resources the highest priority, followed by the processing of SR resources, and followed by the processing of CQI resources. Moreover, the Layer-2 functionality 105 can prioritize the processing of CQI PUCCH resources by giving the processing of Rank Indications (RI) opportunity resources the highest priority.

In one example, the C-RAN 100 can be configured so that up to 36 UEs 112 can be scheduled to have a HARQ, SR, or CQI opportunity during a given TTI. If all of those UEs 112 include the same RP 106 in their combining zone, then the Layer-2 functionality 105 would need to use the conventional load-management techniques discussed above. The results of doing this is shown in FIG. 3.

In this example, UE1 gets an opportunity at subframe (SF=1) for its periodic PUCCH processing and then gets another opportunity at subframe (SF=81). So, addressing an overloaded RP 106 by using prioritized queuing and delayed processing can be viewed as if the periodicity for PUCCH SR and CQI processing for those UEs 112 has been changed. That is, even though all UEs 112 are configured with 20 milliseconds periodicity, as a result of the delayed processing to address an overloaded RP 106 using the conventional load-management techniques, the PUCCH CQI and SR opportunities for such a UE 112 occurs only every 80-100 milliseconds and eventually results in a much larger periodicity.

Delaying such PUCCH processing to such a large degree can result in sub-optimal scheduling decisions by the Layer-2 functionality 105. Moreover, if the PUCCH CQI opportunity that is delayed for a given UE 112 is for a Rank Indication, it is possible that subsequent CQI decoding for that UE 112 may be performed incorrectly and may hinder link-adaptation decisions.

One embodiment of method 200 can be used to offload baseband processing for PUCCH signals received at an overloaded RP 106 to at least one other RP 106. This can be done in order to avoid the issues noted above that may arise with using the conventional load-management techniques to deal with such an RP 106 that is overloaded with baseband processing of HARQ, SR, and CQI PUCCH resources.

In this embodiment, the L2 functionality 105 in the serving controller 104 determines an initial allocation of HARQ, SR, and CQI PUCCH resources for the current TTI for a group of UEs 112 served by the cell 108.

Then, in this embodiment, the L2 functionality 105 determines, for the initial allocation of HARQ, SR, and CQI PUCCH resources, the baseband processing loads for the RPs 106 serving the current cell 108. The Layer-2 functionality 105 does this by using the combining zones for the scheduled UEs 112 to determine which RPs 106 receive PUCCH uplink signals for each scheduled UE 112. The Layer-2 functionality 105 then calculates the overall baseband processing load for each RP 106 by counting the amount of baseband processing that would need to be performed for the HARQ, SR, CQI, and RI PUCCH resources initially allocated to all scheduled UEs 112 that receive uplink signals from that RP 106. One example of such a determination is shown in FIG. 4.

Then, the L2 functionality 105 identifies any overloaded RPs 106. In this embodiment, the L2 functionality 105 does this by doing the following. The L2 functionality 105 determines the total number of HARQ, SR, and CQI PUCCH resources, across all RPs 106 at the site 102, that are to be processed for the current TTI. Also, in this embodiment, the L2 functionality 105 sorts (in descending order) the RPs 106 based on the total amount of HARQ, SR, and CQI PUCCH resources allocated to that RP 106 for the current TTI. The results of this sorting are shown in FIG. 5. In this embodiment, the L2 functionality 105 also determines the average number of HARQ, SR, and CQI PUCCH resources across all RPs 106 at the site 102 that are to be processed for the current TTI.

The L2 functionality 105 considers each RP 106 that has a total HARQ, SR, and CQI PUCCH resource count that exceeds the calculated average to be an overloaded RP (assuming that RP's resource count also exceeds a predetermined threshold value). In the example shown in FIG. 5, RP30, RP31, and RP1 are overloaded.

Then, the L2 functionality 105 off loads at least a portion of the HARQ, SR, and CQI PUCCH baseband processing for PUCCH signals received by at least one overloaded RP 106 to at least one other RP 106 so that the off-loaded baseband processing is performed by the at least one other RP 106. In this embodiment, the L2 functionality 105 does this by doing the following. In this embodiment, the L2 functionality 105 selects the most overloaded RP 106 ("OLRP") and selects the most underloaded RP 106 ("ULRP") and then attempts to pair them together by, for example, checking if the following condition is satisfied, where x is the count of PUCCH resources that need to be processed at the overloaded RP 106 during the current TTI and y is the count of PUCCH resources that need to be processed at the underloaded RP 106 during the current TTI.

$$\left(x - y > \frac{x + y}{2}\right)$$

If the above condition is not satisfied (or there are no remaining underloaded RPs 106 to select for pairing), the selected overloaded and underloaded RPs 106 cannot be paired and the selected overloaded RP 106 (and any remaining overloaded RPs 106) are dealt with using the conventional load-management techniques described above.

If the above condition is satisfied, then the selected overloaded and underloaded RPs 106 can be paired. If this the case, the L2 functionality 105 does not use the conventional load-management techniques for this successfully paired overloaded RP 106 and instead sends a predetermined offload command to the paired overloaded RP 106 and the paired underloaded RP 106. It is to be understood that this is one example of how such pairing can be done and that it can be done in other ways. In one implementation, the offload command comprises a vendor-specific Femto Application Platform Interface (FAPI) extension command that sent from the L2 functionality 105 to the L1 functionality 107, which simulcasts the command over the fronthaul network 118 to all RPs 106 serving the cell 108 (which includes the paired overloaded and underloaded RPs 106). Then, if there are one or more remaining overloaded RPs 106 that need to be dealt with, this pairing process is repeated. That is, the L2 functionality 105 selects the most overloaded RP 106 from the remaining overloaded RPs 106 and selects the most underloaded RP 106 from the remaining underloaded RPs 106 (if any) and then attempts to pair them together by checking if the condition noted above is satisfied If the above condition is not satisfied (or there are no remaining underloaded RPs 106 to select for pairing), the selected overloaded and underloaded RPs 106 cannot be paired and the selected overloaded RP 106 (and any remaining overloaded RPs 106) are dealt with using the conventional load-management techniques described above. If the above condition is satisfied, then the selected overloaded and underloaded RPs 106 can be paired and the L2 functionality 105 does not use the conventional load-management techniques for this paired overloaded RP 106 and instead sends the predetermined offload command to the paired overloaded RP 106 and the underloaded RP 106 as described above. This pairing process is repeated until a selected overloaded RP 106 cannot be paired with an underloaded RPs 106 or until all overloaded RPs 106 have been paired with an underloaded RP 106.

After this pairing process is finished—either because all overloaded RPs 106 have been paired with an underloaded RP 106 or because the remaining overloaded RPs 106 cannot be paired with a corresponding underloaded RP 106—any remaining overloaded RPs 106 are dealt with using the conventional load-management techniques described above.

At the RPs 106, in this example, during the current TTI, analog radio frequency PUCCH signals are received, digitized, and time-domain baseband I/Q samples are produced. In this embodiment, each RP 106 removes the cyclic prefix (CP) samples and performs a Fast Fourier Transform (FFT) operation to generate frequency-domain baseband symbol data for the various physical resource blocks (PRBs) of the current TTI for all antennas 110. In this embodiment, this basic signal processing is performed by all RPs 106 for all signals (PUCCH/PUSCH/SRS) and for the UEs 112 under their influence, as commanded by the L2 functionality 105 for the current TTI.

At this point, each RP 106 checks if it has been commanded to offload further baseband processing of the PUCCH HARQ, SR, and CQI resources for the PUCCH signals received at that RP 106 for the current TTI to another RP 106. As noted above, the Layer-2 functionality 105 commands an RP 106 to do this by sending an appropriate offload command to (at least) the RPs 106 that are involved. If the RP 106 has been commanded to offload further baseband processing of the PUCCH HARQ, SR, and CQI resources for PUCCH signals received at that RP 106 for the current TTI to another RP 106, the RP 106 communicates, to that other RP 106, the PUCCH frequency-domain baseband symbol data (and the associated FFT scaling-factors) produced at the overloaded RP 106 for all of the antennas 110 for the current TTI and does not perform further baseband processing for those resources. This can be done on a symbol-by-symbol basis in order to reduce delays in the overall Layer-1 processing. In one implementation, the RPs 106 are configured to use a vendor-specific proprietary RP-to-RP message and command for communicating the PUCCH frequency-domain baseband symbol data (and the associated FFT scaling-factors) from an overloaded RP 106 to an underloaded RP 106.

In this example, further baseband processing for all PUCCH HARQ, SR, and CQI resources are offloaded.

Each RP 106 that has been commanded to perform further baseband processing of PUCCH HARQ, SR, and CQI resources for an overloaded RP 106 will receive each message sent from that overloaded RP 106 containing PUCCH frequency-domain baseband symbol data (and associated FFT scaling-factors) produced for each symbol at that overloaded RP 102. In one implementation, once the RP 106 receives the symbol data for an entire slot, the RP 106 initiates local PUCCH processing. Once the symbol data for an entire TTI has been received and processed, the full decoding of the PUCCH HARQ, SR, and CQI resources is performed and the SINR values are estimated. Once this is completed, the RP 106 sends the decoded PUCCH reports or indications and SINR values to the serving controller 104 in messages that indicate that the decoded PUCCH reports or indications and SINR values are for PUCCH signals received at the overloaded RP 106, not the underloaded RP 106 that performed the offloaded baseband processing. The underloaded RP 106 may also have its own PUCCH signals to process for the current TTI. The underloaded RP 106 will continue to perform such processing and will send the resulting decoded PUCCH reports or indications and SINR values to the serving controller 106 in messages that indicate that the decoded PUCCH reports or indications and SINR values are for PUCCH signals received at the underloaded RP 106.

The Layer-1 functionality 107 in the serving controller 104 receives the decoded PUCCH reports or indications and SINR values from the various RPs 106, sorts the results for every UE PUCCH indication across different RPs 106, performs selection-combining (based on the SINR reported for each UE 112 by specific RPs 106), and sends its results to Layer-2 functionality 105 via FAPI-indication.

By offloading PUCCH baseband signal processing as described above, RP-specific PUCCH signal processing limitations can be overcome. Additionally, offloading PUCCH baseband signal processing as described above reduces the processing load in the controller 104 that is associated with performing the conventional load-balancing techniques described above, which take considerable processing and memory resources. Also, by offloading PUCCH baseband signal processing as described above, the latency in, and the skipping of, PUCCH HARQ, SR, and CQI processing that would have otherwise resulted from using conventional load-balancing techniques can be avoided. This enables the full flexibility of Radio Resource Management (RRM) algorithms to tweak the PUCCH CQI and SR periodicities more aggressively and in a more dynamic fashion. Offloading PUCCH baseband signal processing as described above enables these advantages to be achieved without having to deploy additional processing resources by more efficiently utilizing the processing resources that are already distributed across the various RPs 106.

Another usage scenario is illustrated in FIG. 6. In this usage scenario, one or more instances of a radio point 106 implemented by a multiple-instance radio point unit 190 as described above in connection with FIG. 1C are used to interface the C-RAN system 100 to a distributed antenna system (DAS) 600. As shown in FIG. 6, DAS 600 typically includes one or more master units 602 (also referred to as a "central area node" or "CAN") that are communicatively coupled to a plurality of remote antenna units (RAUs) 604 (also referred to as "carrier access points" or "CAPs" or "universal access points" or "UAPs"), where each remote antenna unit 604 can be coupled directly to one or more of the master units 602 or indirectly via one or more other remote antenna units 602 and/or via one or more intermediary or expansion units (606) (also referred to as a "transport extension nodes" or "TENs"). A DAS 600 is typically used to improve the coverage provided by one or more base stations that are coupled to the master units 602. These base stations can be coupled to the master units 602 via one or more cables (as is the case in the example shown in FIG. 6).

In general, each master unit 602 receives one or more downlink signals from one or more base stations and generates one or more downlink transport signals derived from one or more of the received downlink base station signals. Each master unit 602 transmits one or more downlink transport signals to one or more of the remote antenna units 604. Each remote antenna unit 604 receives the downlink transport signals transmitted to it from one or more master units 602 and uses the received downlink transport signals to generate one or more downlink radio frequency signals that are radiated from one or more coverage antennas associated with that remote antenna unit 604. The downlink radio frequency signals are radiated for reception by user equipment 112. Typically, this involves, among other things, simulcasting downlink signals received from each base station from multiple remote antenna units 604. In this way, the DAS 600 increases the coverage area for the downlink capacity provided by the base stations.

Likewise, each remote antenna unit 604 receives one or more uplink radio frequency signals transmitted from the user equipment 112. Each remote antenna unit 604 generates one or more uplink transport signals derived from the one or more uplink radio frequency signals and transmits them to one or more of the master units 602. Each master unit 602 receives the respective uplink transport signals transmitted to it from one or more remote antenna units 604 and uses the received uplink transport signals to generate one or more uplink base station radio frequency signals that are provided to the one or more base stations associated with that master unit 602. Typically, this involves, among other things, combining or summing uplink signals received from multiple remote antenna units 604 in order to produce the base station signal provided to each base station. In this way, the DAS 600 increases the coverage area for the uplink capacity provided by the base stations.

The DAS 600 can use either digital transport, analog transport, or combinations of digital and analog transport for generating and communicating the transport signals between the master units 602 and the remote antenna units 604 (and any expansion units 606).

In the example shown in FIG. 6, the DAS 600 is used to improve wireless coverage within a building 608 having multiple floors 610. In this example, the remote antenna units 604 are grouped into zones, where each zone is associated with a respective floor 610 of the building 608. It is to be understood, however, that the zones can be configured in other ways (for example, where one or more zones is associated with multiple floors of a building and/or where one or more floors includes multiple zones).

As noted above, in this usage scenario illustrated in FIG. 6, multiple instances of a radio point 106 implemented using a multiple-instance radio point unit 190 are used to couple a single C-RAN system 100 to the DAS 600. All of the radio point instances implemented using the multiple-instance radio point unit 190 are a part of the same C-RAN 100 that serves the same cell 108 (using the same center frequency). Each of the multiple radio instances implemented using the multiple-instance radio point unit 190 are coupled to a different zone of the DAS 600, where the antenna interface of the radio module 182 used to implement each such radio point instance is coupled to the corresponding base station interface of a master unit 602 for the associated zone.

In the example shown in FIG. 6, a first radio point instance 106-1 is coupled to a first zone (Zone 1), which includes a first group of remote antenna units 604-1-604-6. A second radio point instance 106-2 is coupled to a second zone (Zone 2), which includes a second group of remote antenna units 604-7-604-12. A third radio point instance 106-3 is coupled to a third zone (Zone 3), which includes a third group of remote antenna units 604-13-604-18. A fourth radio point instance 106-4 is coupled to a fourth zone (Zone 4), which includes a fourth group of remote antenna units 604-19-604-24.

Depending on the occupancy of the building 608, certain remote antenna units 604 might have more UEs 112 under them than others, thereby putting more load on the corresponding radio point instance that is coupled to the corresponding zone. If this happens, for example, to one or more of the remote antenna units 604 in zone 2 (that is, one or more of remotes 604-7-604-12 in this example), the radio point instance 106-2 that is coupled to that zone can become overloaded. In order to address this condition, at least a portion of the HARQ, SR, and CQI PUCCH baseband for the overloaded radio point instance RP-2 can be offloaded to one or more of the other radio point instances in the same multiple-instance radio point unit 190. As a result of doing this, in DAS applications, a C-RAN system can achieve parity with carrier-grade eNodeBs (which typically do not have per-radio-point resource limitations). Moreover, because both the overloaded radio point instance and the underloaded radio point instances to which baseband processing is being offloaded are implemented in the same multiple-instance radio point unit 190, the overloaded and underloaded radio point instances are able to communicate with each other using internal messaging (via the shared memory 188), thereby avoiding the need for such communications to occur over the fronthaul network 118.

In the various examples described above, both the overloaded and underloaded RPs 106 serve the same sector (cell 108). However, that need not be the case. For example, in multi-sector deployments, where different sectors (cells) are served by different groupings of controllers 104 and RPs 106, a controller 104 having an overloaded RP 106 for a first sector can offload baseband processing to an underloaded RP 106 serving a second sector. This can be done as long as there is sufficient connectivity and time synchronization between the overloaded RP 106 and the underloaded RP 106. Also, additional information (such as a physical cell identifier (PCI), PUCCH (or other channel) configurations, connectivity information such as Ethernet addresses) may also need to be exchanged between controllers 104 and RPs 106 in different sectors.

Also, in the specific PUCCH example described above, the PUCCH baseband processing for all resources are offloaded from the overloaded RP 106 to the underloaded RP 106. However, in other embodiments, the overloaded RP 106 can continue to perform all PUCCH baseband processing for at least some resources or UEs 112. For example, the overloaded RP 106 can continue to perform all PUCCH baseband processing for the maximum amount of resources that the RP 106 can process in a given TTI while offloading the PUCCH baseband processing for any remaining resources to another RP 106.

Also, in the specific PUCCH example described above, all PUCCH baseband processing after the FFT operation is offloaded from the overloaded RP 106 to the underloaded RP 106. However, in other embodiments, the overloaded RP 106 continues to perform some additional PUCCH baseband processing. For example, the overloaded RP 106 can perform UE-agnostic processing (such as channel estimation and noise-power estimation) and offload the processing and decoding of PUCCH symbols to the underloaded RP 106. In such an example, the results of the UE-agnostic processing can be forwarded from the overloaded RP 106 to the underloaded RP 106 along with the frequency-domain PUCCH symbol data. Then, the underloaded RP 106 can perform the remaining PUCCH baseband processing and send all results to the serving controller 104. In this way, some percentage (for example, 25 percent) of PUCCH baseband processing can be performed by the overloaded RP 106 while the remaining processing (for example, the remaining 75 percent) can be performed by the underloaded RP 106. In such an embodiment where the overloaded RP 106 processes the PUCCH Demodulation Reference Signal (DMRS) symbol data, the overloaded RP 106 need not send the PUCCH DMRS symbol data to the underloaded RP 106. This can reduce the amount of fronthaul traffic that would otherwise need to be communicated between the overloaded RP 106 and the underloaded RP 106. Doing this can reduce the amount of such fronthaul traffic by ⅔ths to ⅗ths, depending on the DMRS format used.

Also, the particular example described above is described as being used to offload PUCCH baseband processing. However, baseband processing for any channels—uplink and/or downlink channels—can be offloaded using these techniques. As noted above, for uplink channels, RF signals are received at each overloaded RP 106 (via the antennas 110 associated with that RP 106) and generates digital baseband data from the received signals. In general, the overloaded RP 106 will perform any baseband processing that has not been offloaded and forwards the resulting baseband data to the appropriate underloaded RP 106 that is performing the off-loaded baseband processing in place of that overloaded RP 106. The underloaded RP 106 receives the baseband information and performs the off-loaded baseband processing. After the underloaded RP 106 has performed the off-loaded baseband processing for the off-loaded resource, the resulting baseband data is communicated over the fronthaul network 118 to the serving controller 104. In one example, the overloaded RP 106 can perform the basic UE-agnostic baseband processing (such as the Fast Fourier Transform (FFT)) and send the resulting baseband data to the underloaded RP 106. In such example, the underloaded RP 106 performs the remaining signal processing (including channel and noise estimation, symbol decoding, SINR calculations, etc.), and sends the resulting data to the controller 104.

As noted above, for downlink channels, baseband information for each off-loaded resource is communicated over the fronthaul network 118 to the underloaded RP 106 that is performing the off-loaded baseband processing in place of the corresponding overloaded RP 106. The underloaded RP 106 receives the baseband information and performs the off-loaded baseband processing. After the underloaded RP 106 has performed the off-loaded baseband processing for the off-loaded resource, the resulting baseband data is communicated to the corresponding overloaded RP 106, which uses the resulting baseband data to perform any remaining minimal baseband processing that needs to be performed and to generate RF signals for radiating from the antennas 110 associated with that overloaded RP 106. In one example, the underloaded RP 106 can perform steps like pre-coding, modulation, rate-matching, etc. and send the resulting baseband data to the overloaded RP 106, which performs the UE-agnostic processing (such as resource element mapping and inverse Fast Fourier Transform (IFFT) processing).

In order to optimize the use of fronthaul bandwidth, a quantization scheme can be used for communicating the data among RPs 106 and/or other between controllers 104 and RPs 106.

For example, where the offloading of PUCCH baseband processing is triggered for a first overloaded RP 106, at least some PUCCH baseband processing for PUCCH signals received at the other RPs 106 in the combining zones of the affected UEs 112 is also offloaded to the same single underloaded RP 106 (even though those other RPs 106 may not be overloaded). That single underloaded RP 106 can use special multi-antenna combining algorithms to improve the PUCCH gain. This provides an opportunity to reduce the transmit-power of the UEs 112 for the low-priority periodic PUCCH signaling, thereby improving the battery-life of the UEs 112.

Other embodiments are implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service comprising: at least one controller; and a plurality of radio points; wherein each of the radio points is associated with at least one antenna and remotely located from the controller, wherein the plurality of radio points is communicatively coupled to the controller; wherein the controller and the plurality of radio points are configured to implement at least one base station in order to provide wireless service to a plurality of user equipment (UEs) using at least one cell; wherein the controller is communicatively coupled to a core network of a wireless service provider; wherein the controller is configured to: determine, for a scheduling interval, an initial resource allocation to one or more UEs for one or more wireless channels used to serve said at least one cell; determine, for the initial resource allocation, initial baseband processing loads for performing baseband processing for signals received at or transmitted by the radio points serving said at least one cell; identify one or more radio points that are overloaded for said scheduling interval based on the initial baseband processing loads; and off-load at least some of the baseband processing for signals received at or transmitted by at least one overloaded radio point to at least one other radio point so that the off-loaded baseband processing is performed by said at least one other radio point.

Example 2 includes the system of Example 1, wherein the controller is configured to use conventional load-management techniques to address any overloaded radio points that do not have at least some of the baseband processing for signals received at or transmitted by said any overloaded radio points off-loaded to another radio point.

Example 3 includes the system of any of Examples 1-2, wherein the scheduling interval comprises a transmission time interval (TTI).

Example 4 includes the system of any of Examples 1-3, wherein the one or more wireless channels comprise at least one of an uplink channel or a downlink channel.

Example 5 includes the system of any of Examples 1-4, wherein the one or more wireless channels comprises at least one of: a Physical Downlink Shared Channel (PDSCH), a Physical Downlink Control Channel (PDCCH), a Physical HARQ Indicator Channel (PHICH), a Physical Control Format Indicator Channel (PCFICH), a Physical Broadcast Channel (PBCH), a Physical Uplink Shared Channel (PUSCH), a Physical Uplink Control Channel (PUCCH), a Physical Random Access Channel (PRACH), and a Sounding Reference Signal (SRS).

Example 6 includes the system of any of Examples 1-5, wherein the one or more wireless channels comprises at least one of: third generation (3G) channel, a fourth generation (4G), and a fifth generation (5G) channel, and a Citizens Broadband Radio Service (CBRS) channel.

Example 7 includes the system of any of Examples 1-6, wherein said at least one overloaded radio point performs a first portion of the baseband processing for signals received at or transmitted by said at least one overloaded radio point and wherein said at least one other radio point performs a second portion of the baseband processing for signals received at or transmitted by said at least one overloaded radio point.

Example 8 includes the system of any of Examples 1-7, wherein the one or more wireless channels comprise one or more uplink channels; wherein said at least one overloaded radio point receives signals for the one or more uplink signals; wherein said at least one overloaded radio point performs at least one of: cyclic prefix (CP) removal and Fast Fourier Transform (FFT) operations; wherein said at least one overloaded radio point communicates, to said at least one other radio point, digital baseband data resulting from the baseband processing performed by said at least one overloaded radio point; and wherein said at least one other radio point performs at least some baseband processing not performed by said at least one overloaded radio point for the one or more uplink signals received by said at least one overloaded radio point.

Example 9 includes the system of any of Examples 1-8, wherein the one or more wireless channels comprise one or more downlink channels; wherein said at least one other radio point performs at least some baseband processing that is not performed by said at least one overloaded radio point for the downlink signals to be radiated by said at least one overloaded radio point; wherein said at least one other radio point communicates, to said at least one overloaded radio point, digital baseband data resulting from the baseband processing performed by said at least one other radio point; and wherein said at least one overloaded radio point performs at least one of: resource element mapping and Inverse Fast Fourier Transform (IFFT) operations; and wherein said at least one overloaded radio point generates the downlink signals to be radiated by said at least one overloaded radio point.

Example 10 includes the system of any of Examples 1-9, wherein the one or more wireless channels comprise a Physical Uplink Control Channel (PUCCH); and wherein at least some of the baseband processing of the uplink signals for the PUCCH off-loaded from said at least one overloaded radio point to said at least one other radio point comprises at least some of the baseband processing of at least one of: hybrid automatic repeat request (HARQ) resources, Scheduling Request (SR) resources, Channel Quality Indication (CQI) resources, and Rank Indication (RI) resources.

Example 11 includes the system of any of Examples 1-10, wherein the controller is configured to off-load at least some of the baseband processing for signals received at or transmitted by at least one overloaded radio point to at least one other radio point so that the off-loaded baseband processing is performed by said at least one other radio point by doing the following: sorting the radio points based on the initial baseband processing loads for performing baseband processing for signals received at or transmitted by the radio points; pairing an overloaded radio point with an underloaded radio point; and off-loading at least some of the baseband processing for signals received at or transmitted by said paired overloaded radio point to said paired underloaded radio point so that the off-loaded baseband processing is performed by said paired underloaded radio point.

Example 12 includes the system of any of Examples 1-11, wherein said at least one overloaded radio point and said at least one other radio point to which said at least some baseband processing off-loaded serve either the same cell or different cells.

Example 13 includes the system of any of Examples 1-12, wherein the controller is configured to off-load at least some of the baseband processing for signals received at or transmitted by one overloaded radio point to one other radio point so that the off-loaded baseband processing is performed by said one other radio point.

Example 14 includes the system of any of Examples 1-13, wherein the controller is configured to off-load at least some of the baseband processing for signals received at or transmitted by one overloaded radio point to multiple other radio points so that the off-loaded baseband processing is performed by said multiple other radio points.

Example 15 includes the system of any of Examples 1-14, wherein the controller is configured to off-load at least some of the baseband processing for signals received at or transmitted by multiple overloaded radio points to one other radio point so that the off-loaded baseband processing is performed by said one other radio point.

Example 16 includes the system of Example 15, wherein the off-loaded baseband processing performed by said one other radio point comprises antenna combining for signals received at said multiple overloaded radio points.

Example 17 includes the system of any of Examples 1-16, wherein the controller is configured to off-load at least some of the baseband processing for signals received at or transmitted by multiple overloaded radio points to multiple other radio points so that the off-loaded baseband processing is performed by said multiple other radio points.

Example 18 includes the system of any of Examples 1-17, wherein baseband data for the signals to be received at or transmitted from the overloaded radio point is communicated between the overloaded radio point and said at least one other radio point.

Example 19 includes the system of any of Examples 1-18, wherein baseband data for the signals to be received at or transmitted from the overloaded radio point is communicated between the overloaded radio point and said at least one other radio point over a fronthaul network.

Example 20 includes the system of any of Examples 1-19, wherein the radio points included in a first subset of the radio points are implemented using single-instance radio point units and the radio points included in a second subset of the radio points are implemented using one or more multiple-instance radio point units.

Example 21 includes the system of Example 20, wherein, for said scheduling interval, one of the following is true: said at least one overloaded radio point is in the first subset of the radio points and said least one other radio point that performs the off-loaded baseband processing is in the second subset of the radio points; said at least one overloaded radio point is in the second subset of the radio points and said least one other radio point that performs the off-loaded baseband processing is in the first subset of the radio points; wherein said at least one overloaded radio point is in the first subset of the radio points and said least one other radio point that performs the off-loaded baseband processing is in the first subset of the radio points; and wherein said at least one overloaded radio point is in the second subset of the radio points and said least one other radio point that performs the off-loaded baseband processing is in the second subset of the radio points.

Example 22 includes the system of any of Examples 1-21, wherein at least some of the radio points comprise logical radio point instances implemented by a multiple-instance radio point unit.

Example 23 includes the system of Example 22, wherein the multiple-instance radio point unit is coupled to a master unit of distributed antenna system.

Example 24 includes the system of any of Examples 22-23, wherein the overloaded radio point and said at least one other radio point comprises respective local radio point instances implemented by the multiple-instance radio point unit; and wherein baseband data for the signals to be received at or transmitted from the overloaded radio point is communicated between the respective logical radio point instance for the overloaded radio point and the respective logical radio point for the other radio point using shared memory included in the multiple-instance radio point unit.

Example 25 includes the system of any of Examples 1-24, further comprising multiple controllers used to serve multiple cells, wherein each controller is associated with multiple radio points included in the plurality of radio points; and wherein said at least one overloaded radio point and said at least one other radio point are one of: associated with the same controller and serving the same cell; or associated with different controllers and serving different cells.

Example 26 includes a method of load balancing baseband processing in a wireless system comprising at least one controller and a plurality of radio points, wherein each of the radio points is associated with at least one antenna and remotely located from the controller, wherein the plurality of radio points is communicatively coupled to the controller, wherein the controller and the plurality of radio points are configured to implement at least one base station in order to provide wireless service to a plurality of user equipment (UEs) using at least one cell, wherein the controller is communicatively coupled to a core network of a wireless service provider, the method comprising: determining, for a scheduling interval, an initial resource allocation to one or more UEs for one or more wireless channels used to serve said at least one cell; determining, for the initial resource allocation, initial baseband processing loads for performing baseband processing for signals received at or transmitted by the radio points serving said at least one cell; identifying one or more radio points that are overloaded for said scheduling interval based on the initial baseband processing loads; and off-loading at least some of the baseband processing for signals received at or transmitted by at least one overloaded radio point to at least one other radio point so that the off-loaded baseband processing is performed by said at least one other radio point.

Example 27 includes the method of Example 26, further comprising: using conventional load-management techniques to address any overloaded radio points that do not have at least some of the baseband processing for signals received at or transmitted by said any overloaded radio points off-loaded to another radio point.

Example 28 includes the method of any of Examples 26-27, wherein the scheduling interval comprises a transmission time interval (TTI).

Example 29 includes the method of any of Examples 26-28, wherein the one or more wireless channels comprise at least one of an uplink channel or a downlink channel.

Example 30 includes the method of any of Examples 26-29, wherein the one or more wireless channels comprises at least one of: a Physical Downlink Shared Channel (PDSCH), a Physical Downlink Control Channel (PDCCH), a Physical HARQ Indicator Channel (PHICH), a Physical Control Format Indicator Channel (PCFICH), a Physical Broadcast Channel (PBCH), a Physical Uplink Shared Channel (PUSCH), a Physical Uplink Control Channel (PUCCH), a Physical Random Access Channel (PRACH), and Sounding Reference Signal (SRS).

Example 31 includes the method of any of Examples 26-30, wherein the one or more wireless channels comprises at least one of: third generation (3G) channel, a fourth generation (4G), and a fifth generation (5G) channel, and a Citizens Broadband Radio Service (CBRS) channel.

Example 32 includes the method of any of Examples 26-31, wherein said at least one overloaded radio point performs a first portion of the baseband processing for signals received at or transmitted by said at least one overloaded radio point and wherein said at least one other radio point performs a second portion of the baseband processing for signals received at or transmitted by said at least one overloaded radio point.

Example 33 includes the method of any of Examples 26-32, wherein the one or more wireless channels comprise one or more uplink channels; wherein said at least one overloaded radio point receives signals for the one or more uplink signals; wherein said at least one overloaded radio point performs at least one of: cyclic prefix (CP) removal and Fast Fourier Transform (FFT) operations; wherein said at least one overloaded radio point communicates, to said at least one other radio point, digital baseband data resulting from the baseband processing performed by said at least one overloaded radio point; and wherein said at least one other radio point performs at least some baseband processing not performed by said at least one overloaded radio point for the one or more uplink signals received by said at least one overloaded radio point.

Example 34 includes the method of any of Examples 26-33, wherein the one or more wireless channels comprise one or more downlink channels; wherein said at least one other radio point performs at least some baseband processing that is not performed by said at least one overloaded radio point for the downlink signals to be radiated by said at least one overloaded radio point; wherein said at least one other radio point communicates, to said at least one overloaded radio point, digital baseband data resulting from the baseband processing performed by said at least one other radio point; and wherein said at least one overloaded radio point performs at least one of: resource element mapping and Inverse Fast Fourier Transform (IFFT) operations; and wherein said at least one overloaded radio point generates the downlink signals to be radiated by said at least one overloaded radio point.

Example 35 includes the method of any of Examples 26-34, wherein the one or more wireless channels comprise a Physical Uplink Control Channel (PUCCH); and wherein at least some of the baseband processing of the uplink signals for the PUCCH off-loaded from said at least one overloaded radio point to said at least one other radio point comprises at least some of the baseband processing of at least one of: hybrid automatic repeat request (HARQ) resources, Scheduling Request (SR) resources, Channel Quality Indication (CQI) resources, and Rank Indication (RI) resources.

Example 36 includes the method of any of Examples 26-35, wherein off-loading at least some of the baseband processing for signals received at or transmitted by at least one overloaded radio point to at least one other radio point so that the off-loaded baseband processing is performed by said at least one other radio point comprises: sorting the radio points based on the initial baseband processing loads for performing baseband processing for signals received at or transmitted by the radio points; pairing an overloaded radio point with an underloaded radio point; and off-loading at least some of the baseband processing for signals received at or transmitted by said paired overloaded radio point to said paired underloaded radio point so that the off-loaded baseband processing is performed by said paired underloaded radio point.

Example 37 includes the method of any of Examples 26-36, wherein said at least one overloaded radio point and said at least one other radio point to which said at least some baseband processing off-loaded serve either the same cell or different cells.

Example 38 includes the method of any of Examples 26-37, wherein off-loading at least some of the baseband processing for signals received at or transmitted by at least one overloaded radio point to at least one other radio point so that the off-loaded baseband processing is performed by said at least one other radio point comprises: off-loading at least some of the baseband processing for signals received at or transmitted by one overloaded radio point to one other radio point so that the off-loaded baseband processing is performed by said one other radio point.

Example 39 includes the method of any of Examples 26-38, wherein off-loading at least some of the baseband processing for signals received at or transmitted by at least one overloaded radio point to at least one other radio point so that the off-loaded baseband processing is performed by said at least one other radio point comprises: off-loading at least some of the baseband processing for signals received at or transmitted by one overloaded radio point to multiple other radio points so that the off-loaded baseband processing is performed by said multiple other radio points.

Example 40 includes the method of any of Examples 26-39, wherein off-loading at least some of the baseband processing for signals received at or transmitted by at least one overloaded radio point to at least one other radio point so that the off-loaded baseband processing is performed by said at least one other radio point comprises: off-loading at least some of the baseband processing for signals received at or transmitted by multiple overloaded radio points to one other radio point so that the off-loaded baseband processing is performed by said one other radio point.

Example 41 includes the method of Example 40, wherein the off-loaded baseband processing performed by said one other radio point comprises antenna combining for signals received at said multiple overloaded radio points.

Example 42 includes the method of any of Examples 26-41, wherein off-loading at least some of the baseband processing for signals received at or transmitted by at least one overloaded radio point to at least one other radio point so that the off-loaded baseband processing is performed by said at least one other radio point comprises: off-loading at least some of the baseband processing for signals received at or transmitted by multiple overloaded radio points to multiple other radio points so that the off-loaded baseband processing is performed by said multiple other radio points.

Example 43 includes the method of any of Examples 26-42, wherein baseband data for the signals to be received at or transmitted from the overloaded radio point is communicated between the overloaded radio point and said at least one other radio point.

Example 44 includes the method of any of Examples 26-43, wherein baseband data for the signals to be received at or transmitted from the overloaded radio point is communicated between the overloaded radio point and said at least one other radio point over a fronthaul network.

Example 45 includes the method of any of Examples 26-44, wherein the radio points included in a first subset of the radio points are implemented using single-instance radio point units and the radio points included in a second subset of the radio points are implemented using one or more multiple-instance radio point units.

Example 46 includes the method of Example 45, wherein, for said scheduling interval, one of the following is true: said at least one overloaded radio point is in the first subset of the radio points and said least one other radio point that performs the off-loaded baseband processing is in the second subset of the radio points; said at least one overloaded radio point is in the second subset of the radio points and said least one other radio point that performs the off-loaded baseband processing is in the first subset of the radio points; wherein said at least one overloaded radio point is in the first subset of the radio points and said least one other radio point that performs the off-loaded baseband processing is in the first subset of the radio points; and wherein said at least one overloaded radio point is in the second subset of the radio points and said least one other radio point that performs the off-loaded baseband processing is in the second subset of the radio points.

Example 47 includes the method of any of Examples 26-46, wherein at least some of the radio points comprise logical radio point instances implemented by a multiple-instance radio point unit.

Example 48 includes the method of Example 47, wherein the multiple-instance radio point unit is coupled to a master unit of distributed antenna system.

Example 49 includes the method of any of Examples claim 47-48, wherein the overloaded radio point and said at least one other radio point comprises respective local radio point instances implemented by the multiple-instance radio point unit; and wherein baseband data for the signals to be received at or transmitted from the overloaded radio point is communicated between the respective logical radio point instance for the overloaded radio point and the respective logical radio point for the other radio point using shared memory included in the multiple-instance radio point unit.

Example 50 includes the method of any of Examples 26-49, wherein multiple controllers are used to serve multiple cells, wherein each controller is associated with multiple radio points included in the plurality of radio points; and wherein said at least one overloaded radio point and said at least one other radio point are one of: associated with the same controller and serving the same cell; or associated with different controllers and serving different cells.

What is claimed is:

1. A system to provide wireless service comprising:
at least one controller; and
a plurality of radio points;
wherein each of the plurality of radio points is associated with at least one antenna and remotely located from the at least one controller, wherein the plurality of radio points is communicatively coupled to the at least one controller;
wherein the at least one controller and the plurality of radio points are configured to implement at least one base station in order to provide wireless service to a plurality of user equipment (UEs) using at least one cell;
wherein each radio point of the plurality of radio points is configured to perform at least some baseband processing for the at least one base station;
wherein the at least one controller is communicatively coupled to a core network of a wireless service provider;
wherein the at least one controller is configured to:
determine, for a scheduling interval, an initial resource allocation to one or more UEs for one or more wireless channels used to serve said at least one cell;
determine, for the initial resource allocation, initial baseband processing loads for performing baseband processing for signals received at or transmitted by the plurality of radio points serving said at least one cell;
identify one or more overloaded radio points that is associated with an amount of baseband processing in excess of its capacity for said scheduling interval based on the initial baseband processing loads; and
off-load at least some of the baseband processing for signals received at or transmitted by at least one overloaded radio point to at least one other radio point so that the off-loaded baseband processing is performed by said at least one other radio point receiving an assignment of the off-loaded baseband processing.

2. The system of claim 1, wherein the at least one controller is configured to use conventional load-management techniques to address any overloaded radio points that do not have at least some of the baseband processing for signals received at or transmitted by said any overloaded radio points off-loaded to another radio point.

3. The system of claim 1, wherein the scheduling interval comprises a transmission time interval (TTI).

4. The system of claim 1, wherein the one or more wireless channels comprise at least one of an uplink channel or a downlink channel.

5. The system of claim 1, wherein the one or more wireless channels comprises at least one of: a Physical Downlink Shared Channel (PDSCH), a Physical Downlink Control Channel (PDCCH), a Physical HARQ Indicator Channel (PHICH), a Physical Control Format Indicator Channel (PCFICH), a Physical Broadcast Channel (PBCH), a Physical Uplink Shared Channel (PUSCH), a Physical Uplink Control Channel (PUCCH), a Physical Random Access Channel (PRACH), and a Sounding Reference Signal (SRS).

6. The system of claim 1, wherein the one or more wireless channels comprises at least one of: third generation (3G) channel, a fourth generation (4G), and a fifth generation (5G) channel, and a Citizens Broadband Radio Service (CBRS) channel.

7. The system of claim 1, wherein said at least one overloaded radio point performs a first portion of the baseband processing for signals received at or transmitted by said at least one overloaded radio point and wherein said at least one other radio point performs a second portion of the baseband processing for signals received at or transmitted by said at least one overloaded radio point.

8. The system of claim 1, wherein the one or more wireless channels comprise one or more uplink channels;
wherein said at least one overloaded radio point receives uplink signals for the one or more uplink channels;
wherein said at least one overloaded radio point performs at least one of: cyclic prefix (CP) removal and Fast Fourier Transform (FFT) operations;
wherein said at least one overloaded radio point communicates, to said at least one other radio point, digital baseband data resulting from the baseband processing performed by said at least one overloaded radio point; and
wherein said at least one other radio point performs at least some baseband processing not performed by said at least one overloaded radio point for the uplink signals received by said at least one overloaded radio point.

9. The system of claim 1, wherein the one or more wireless channels comprise one or more downlink channels;
wherein said at least one other radio point performs at least some baseband processing that is not performed by said at least one overloaded radio point for downlink signals to be radiated by said at least one overloaded radio point;
wherein said at least one other radio point communicates, to said at least one overloaded radio point, digital baseband data resulting from the baseband processing performed by said at least one other radio point; and
wherein said at least one overloaded radio point performs at least one of: resource element mapping and Inverse Fast Fourier Transform (IFFT) operations; and
wherein said at least one overloaded radio point generates the downlink signals to be radiated by said at least one overloaded radio point.

10. The system of claim 1, wherein the one or more wireless channels comprise a Physical Uplink Control Channel (PUCCH); and
wherein at least some of the baseband processing of uplink signals for the PUCCH off-loaded from said at least one overloaded radio point to said at least one other radio point comprises at least some of the baseband processing of at least one of: hybrid automatic repeat request (HARQ) resources, Scheduling Request (SR) resources, Channel Quality Indication (CQI) resources, and Rank Indication (RI) resources.

11. The system of claim 1, wherein the at least one controller is configured to off-load at least some of the baseband processing for signals received at or transmitted by at least one overloaded radio point to at least one other radio point so that the off-loaded baseband processing is performed by said at least one other radio point by doing the following:
sorting the plurality of radio points based on the initial baseband processing loads for performing baseband processing for signals received at or transmitted by the plurality of radio points;
pairing an overloaded radio point with an underloaded radio point; and
off-loading at least some of the baseband processing for signals received at or transmitted by said paired overloaded radio point to said paired underloaded radio point so that the off-loaded baseband processing is performed by said paired underloaded radio point.

12. The system of claim 1, wherein said at least one overloaded radio point and said at least one other radio point to which said at least some baseband processing off-loaded serve either the same cell or different cells.

13. The system of claim 1, wherein the at least one controller is configured to off-load at least some of the baseband processing for signals received at or transmitted by one overloaded radio point to one other radio point so that the off-loaded baseband processing is performed by said one other radio point.

14. The system of claim 1, wherein the at least one controller is configured to off-load at least some of the baseband processing for signals received at or transmitted by one overloaded radio point to multiple other radio points so that the off-loaded baseband processing is performed by said multiple other radio points.

15. The system of claim 1, wherein the at least one controller is configured to off-load at least some of the baseband processing for signals received at or transmitted by multiple overloaded radio points to one other radio point so that the off-loaded baseband processing is performed by said one other radio point.

16. The system of claim 15, wherein the off-loaded baseband processing performed by said one other radio point comprises antenna combining for signals received at said multiple overloaded radio points.

17. The system of claim 1, wherein the at least one controller is configured to off-load at least some of the baseband processing for signals received at or transmitted by multiple overloaded radio points to multiple other radio points so that the off-loaded baseband processing is performed by said multiple other radio points.

18. The system of claim 1, wherein baseband data for the signals to be received at or transmitted from the overloaded radio point is communicated between the overloaded radio point and said at least one other radio point.

19. The system of claim 1, wherein baseband data for the signals to be received at or transmitted from the overloaded radio point is communicated between the overloaded radio point and said at least one other radio point over a fronthaul network.

20. The system of claim 1, wherein radio points included in a first subset of the plurality of radio points are implemented using single-instance radio point units and radio points included in a second subset of the plurality of radio points are implemented using one or more multiple-instance radio point units.

21. The system of claim 20, wherein, for said scheduling interval, one of the following is true:
said at least one overloaded radio point is in the first subset of the plurality of radio points and said least one other radio point that performs the off-loaded baseband processing is in the second subset of the plurality of radio points;
said at least one overloaded radio point is in the second subset of the plurality of radio points and said least one other radio point that performs the off-loaded baseband processing is in the first subset of the plurality of radio points;
wherein said at least one overloaded radio point is in the first subset of the plurality of radio points and said least one other radio point that performs the off-loaded baseband processing is in the first subset of the plurality of radio points; and wherein said at least one overloaded radio point is in the second subset of the plurality of radio points and said least one other radio point that performs the off-loaded baseband processing is in the second subset of the plurality of radio points.

22. The system of claim 1, wherein at least some of the plurality of radio points comprise logical radio point instances implemented by a multiple-instance radio point unit.

23. The system of claim 22, wherein the multiple-instance radio point unit is coupled to a master unit of distributed antenna system.

24. The system of claim 22, wherein the overloaded radio point and said at least one other radio point comprises respective local radio point instances implemented by the multiple-instance radio point unit; and
wherein baseband data for the signals to be received at or transmitted from the overloaded radio point is communicated between the respective logical radio point instance for the overloaded radio point and the respective logical radio point for the other radio point using shared memory included in the multiple-instance radio point unit.

25. The system of claim 1, further comprising multiple controllers used to serve multiple cells, wherein each controller is associated with multiple radio points included in the plurality of radio points; and
wherein said at least one overloaded radio point and said at least one other radio point are one of:
associated with the same controller and serving the same cell; or
associated with different controllers and serving different cells.

26. A method of load balancing baseband processing in a wireless system comprising at least one controller and a plurality of radio points, wherein each of the plurality of radio points is associated with at least one antenna and remotely located from the at least one controller, wherein the plurality of radio points is communicatively coupled to the at least one controller, wherein the at least one controller and the plurality of radio points are configured to implement at least one base station in order to provide wireless service to a plurality of user equipment (UEs) using at least one cell, wherein each radio point of the plurality of radio points is configured to perform at least some baseband processing for the at least one base station, wherein the at least one controller is communicatively coupled to a core network of a wireless service provider, the method comprising:
determining, for a scheduling interval, an initial resource allocation to one or more UEs for one or more wireless channels used to serve said at least one cell;
determining, for the initial resource allocation, initial baseband processing loads for performing baseband processing for signals received at or transmitted by the plurality of radio points serving said at least one cell;
identifying one or more overloaded radio points that is associated with an amount of baseband processing in excess of its capacity for said scheduling interval based on the initial baseband processing loads; and
off-loading at least some of the baseband processing for signals received at or transmitted by at least one overloaded radio point to at least one other radio point so that the off-loaded baseband processing is performed by said at least one other radio point receiving an assignment of the off-loaded baseband processing.

27. The method of claim 26, further comprising: using conventional load-management techniques to address any overloaded radio points that do not have at least some of the baseband processing for signals received at or transmitted by said any overloaded radio points off-loaded to another radio point.

28. The method of claim 26, wherein the scheduling interval comprises a transmission time interval (TTI).

29. The method of claim 26, wherein the one or more wireless channels comprise at least one of an uplink channel or a downlink channel.

30. The method of claim 26, wherein the one or more wireless channels comprises at least one of: a Physical Downlink Shared Channel (PDSCH), a Physical Downlink Control Channel (PDCCH), a Physical HARQ Indicator Channel (PHICH), a Physical Control Format Indicator Channel (PCFICH), a Physical Broadcast Channel (PBCH), a Physical Uplink Shared Channel (PUSCH), a Physical Uplink Control Channel (PUCCH), a Physical Random Access Channel (PRACH), and Sounding Reference Signal (SRS).

31. The method of claim 26, wherein the one or more wireless channels comprises at least one of: third generation (3G) channel, a fourth generation (4G), and a fifth generation (5G) channel, and a Citizens Broadband Radio Service (CBRS) channel.

32. The method of claim 26, wherein said at least one overloaded radio point performs a first portion of the baseband processing for signals received at or transmitted by said at least one overloaded radio point and wherein said at least one other radio point performs a second portion of the baseband processing for signals received at or transmitted by said at least one overloaded radio point.

33. The method of claim 26, wherein the one or more wireless channels comprise one or more uplink channels;
wherein said at least one overloaded radio point receives uplink signals for the one or more uplink channels;
wherein said at least one overloaded radio point performs at least one of: cyclic prefix (CP) removal and Fast Fourier Transform (FFT) operations;
wherein said at least one overloaded radio point communicates, to said at least one other radio point, digital baseband data resulting from the baseband processing performed by said at least one overloaded radio point; and
wherein said at least one other radio point performs at least some baseband processing not performed by said at least one overloaded radio point for the uplink signals received by said at least one overloaded radio point.

34. The method of claim 26, wherein the one or more wireless channels comprise one or more downlink channels;
wherein said at least one other radio point performs at least some baseband processing that is not performed by said at least one overloaded radio point for downlink signals to be radiated by said at least one overloaded radio point;
wherein said at least one other radio point communicates, to said at least one overloaded radio point, digital baseband data resulting from the baseband processing performed by said at least one other radio point; and
wherein said at least one overloaded radio point performs at least one of: resource element mapping and Inverse Fast Fourier Transform (IFFT) operations; and
wherein said at least one overloaded radio point generates the downlink signals to be radiated by said at least one overloaded radio point.

35. The method of claim 26, wherein the one or more wireless channels comprise a Physical Uplink Control Channel (PUCCH); and wherein at least some of the baseband processing of uplink signals for the PUCCH off-loaded from said at least one overloaded radio point to said at least one other radio point comprises at least some of the baseband processing of at least one of: hybrid automatic repeat request (HARQ) resources, Scheduling Request (SR) resources, Channel Quality Indication (CQI) resources, and Rank Indication (RI) resources.

36. The method of claim 26, wherein off-loading at least some of the baseband processing for signals received at or transmitted by at least one overloaded radio point to at least one other radio point so that the off-loaded baseband processing is performed by said at least one other radio point comprises:

sorting the plurality of radio points based on the initial baseband processing loads for performing baseband processing for signals received at or transmitted by the plurality of radio points;

pairing an overloaded radio point with an underloaded radio point; and off-loading at least some of the baseband processing for signals received at or transmitted by said paired overloaded radio point to said paired underloaded radio point so that the off-loaded baseband processing is performed by said paired underloaded radio point.

37. The method of claim 26, wherein said at least one overloaded radio point and said at least one other radio point to which said at least some baseband processing off-loaded serve either the same cell or different cells.

38. The method of claim 26, wherein off-loading at least some of the baseband processing for signals received at or transmitted by at least one overloaded radio point to at least one other radio point so that the off-loaded baseband processing is performed by said at least one other radio point comprises:

off-loading at least some of the baseband processing for signals received at or transmitted by one overloaded radio point to one other radio point so that the off-loaded baseband processing is performed by said one other radio point.

39. The method of claim 26, wherein off-loading at least some of the baseband processing for signals received at or transmitted by at least one overloaded radio point to at least one other radio point so that the off-loaded baseband processing is performed by said at least one other radio point comprises:

off-loading at least some of the baseband processing for signals received at or transmitted by one overloaded radio point to multiple other radio points so that the off-loaded baseband processing is performed by said multiple other radio points.

40. The method of claim 26, wherein off-loading at least some of the baseband processing for signals received at or transmitted by at least one overloaded radio point to at least one other radio point so that the off-loaded baseband processing is performed by said at least one other radio point comprises:

off-loading at least some of the baseband processing for signals received at or transmitted by multiple overloaded radio points to one other radio point so that the off-loaded baseband processing is performed by said one other radio point.

41. The method of claim 40, wherein the off-loaded baseband processing performed by said one other radio point comprises antenna combining for signals received at said multiple overloaded radio points.

42. The method of claim 26, wherein off-loading at least some of the baseband processing for signals received at or transmitted by at least one overloaded radio point to at least one other radio point so that the off-loaded baseband processing is performed by said at least one other radio point comprises:

off-loading at least some of the baseband processing for signals received at or transmitted by multiple overloaded radio points to multiple other radio points so that the off-loaded baseband processing is performed by said multiple other radio points.

43. The method of claim 26, wherein baseband data for the signals to be received at or transmitted from the overloaded radio point is communicated between the overloaded radio point and said at least one other radio point.

44. The method of claim 26, wherein baseband data for the signals to be received at or transmitted from the overloaded radio point is communicated between the overloaded radio point and said at least one other radio point over a fronthaul network.

45. The method of claim 26, wherein radio points included in a first subset of the plurality of radio points are implemented using single-instance radio point units and radio points included in a second subset of the plurality of radio points are implemented using one or more multiple-instance radio point units.

46. The method of claim 45, wherein, for said scheduling interval, one of the following is true:

said at least one overloaded radio point is in the first subset of the plurality of radio points and said least one other radio point that performs the off-loaded baseband processing is in the second subset of the plurality of radio points;

said at least one overloaded radio point is in the second subset of the plurality of radio points and said least one other radio point that performs the off-loaded baseband processing is in the first subset of the plurality of radio points;

wherein said at least one overloaded radio point is in the first subset of the plurality of radio points and said least one other radio point that performs the off-loaded baseband processing is in the first subset of the plurality of radio points; and wherein said at least one overloaded radio point is in the second subset of the plurality of radio points and said least one other radio point that performs the off-loaded baseband processing is in the second subset of the plurality of radio points.

47. The method of claim 26, wherein at least some of the plurality of radio points comprise logical radio point instances implemented by a multiple-instance radio point unit.

48. The method of claim 47, wherein the multiple-instance radio point unit is coupled to a master unit of distributed antenna system.

49. The method of claim 47, wherein the overloaded radio point and said at least one other radio point comprises respective local radio point instances implemented by the multiple-instance radio point unit; and wherein baseband data for the signals to be received at or transmitted from the overloaded radio point is communicated between the respective logical radio point instance for the overloaded radio point and the respective logical radio point for the other radio point using shared memory included in the multiple-instance radio point unit.

50. The method of claim 26, wherein multiple controllers are used to serve multiple cells, wherein each controller is associated with multiple radio points included in the plurality of radio points; and wherein said at least one overloaded radio point and said at least one other radio point are one of:

associated with the same controller and serving the same cell; or associated with different controllers and serving different cells.

* * * * *